United States Patent
Morais et al.

(10) Patent No.: US 9,587,686 B2
(45) Date of Patent: Mar. 7, 2017

(54) GUIDE PIN FOR DISC BRAKE ASSEMBLY AND DISC BRAKE ASSEMBLY INCLUDING SUCH A GUIDE PIN

(71) Applicant: Kelsey-Hayes Company, Livonia, MI (US)

(72) Inventors: Eduardo Morais, South Lyon, MI (US); Kraig Gerber, Plymouth, MI (US); Daniel Smith, Livonia, MI (US)

(73) Assignee: Kelsey-Hayes Company, Livonia, MI (US)

(*) Notice: Subject to any disclaimer, the term of this patent is extended or adjusted under 35 U.S.C. 154(b) by 997 days.

(21) Appl. No.: 13/666,249

(22) Filed: Nov. 1, 2012

(65) Prior Publication Data

US 2014/0116817 A1     May 1, 2014

(51) Int. Cl.
*F16D 65/18* (2006.01)
*F16D 55/227* (2006.01)
*F16D 55/2265* (2006.01)

(52) U.S. Cl.
CPC ........ *F16D 55/227* (2013.01); *F16D 55/2265* (2013.01)

(58) Field of Classification Search
CPC ............... F16D 55/226; F16D 55/2265; F16D 55/22655; F16D 55/227; F16D 2055/007
USPC ................. 188/73.43, 73.44, 73.45
See application file for complete search history.

(56) References Cited

U.S. PATENT DOCUMENTS

| | | |
|---|---|---|
| 3,722,634 A | 3/1973 | Ogasawara et al. |
| 3,744,367 A | 7/1973 | Lerich |
| 4,308,938 A | 1/1982 | Denton |
| 4,313,526 A * | 2/1982 | Farr ................... F16D 55/22655 188/72.4 |
| 4,372,428 A * | 2/1983 | Delaunay .......... F16D 55/22655 188/73.34 |

(Continued)

FOREIGN PATENT DOCUMENTS

| | | |
|---|---|---|
| CN | 1697942 A | 11/2005 |
| DE | 2705788 A1 | 8/1977 |

(Continued)

OTHER PUBLICATIONS

International Search Report for PCT/US2013/067731 dated Feb. 7, 2014.

(Continued)

*Primary Examiner* — Christopher Schwartz
(74) *Attorney, Agent, or Firm* — MacMillan, Sobanski & Todd, LLC

(57) ABSTRACT

A disc brake assembly comprises: an anchor bracket having at least one bore formed therein, the bore defining a first axis; a brake caliper slidably secured to the anchor bracket; a pair of brake pads carried by the disc brake assembly; and at least one guide pin adapted to be disposed in the bore of the anchor bracket, the at least one guide pin defining a second axis; wherein when the at least one guide pin is disposed in the at least one bore of the anchor bracket, the second axis of the at least one guide pin is configured to be offset relative to the first axis of the at least one bore such that there is provided at least one defined point of contact between only a portion of a shank portion of the at least one guide pin and a portion of an inner surface of the at least one bore.

24 Claims, 19 Drawing Sheets

(56) References Cited

U.S. PATENT DOCUMENTS

| | | |
|---|---|---|
| 4,458,790 A | 7/1984 | Hoffman, Jr. et al. |
| 5,526,904 A | 6/1996 | Walden et al. |
| 5,927,446 A | 7/1999 | Evans |
| 6,026,938 A | 2/2000 | Demoise, Jr. et al. |
| 6,039,156 A | 3/2000 | Schneider |
| 8,051,958 B1 | 11/2011 | Rockwell et al. |
| 2006/0049008 A1 | 3/2006 | Kinoshita et al. |
| 2012/0067678 A1 | 3/2012 | Andrews et al. |
| 2014/0116817 A1 | 5/2014 | Morais et al. |

FOREIGN PATENT DOCUMENTS

| | | |
|---|---|---|
| DE | 3032513 A1 | 4/1982 |
| DE | 202008006779 U1 | 7/2008 |
| DE | 102013011469 A1 | 1/2015 |
| EP | 0062403 A1 | 10/1982 |

OTHER PUBLICATIONS

European Extended Search Report, Application No. EP 13850823.9, dated May 31, 2016.

Chinese First Office Action, Application No. 201380062806.7, dated Oct. 26, 2016.

\* cited by examiner

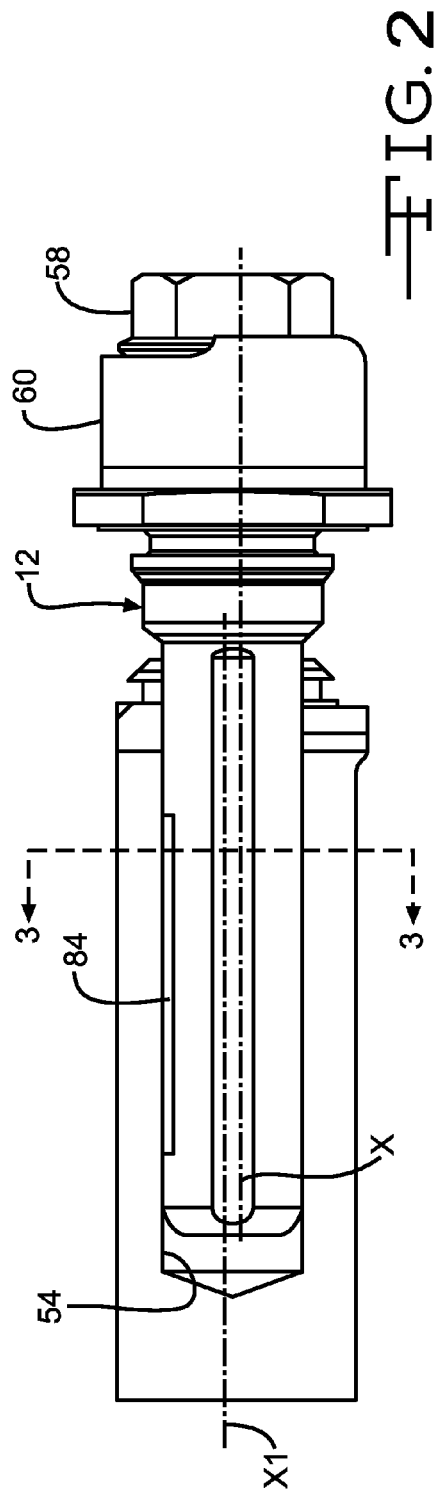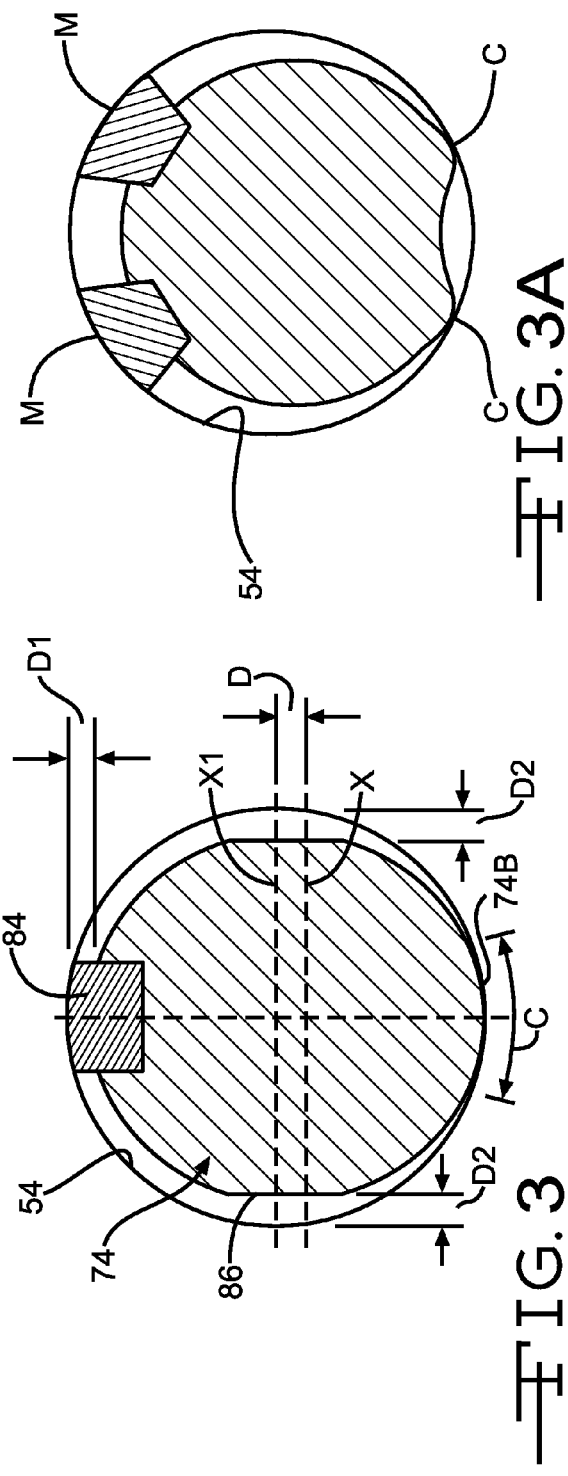

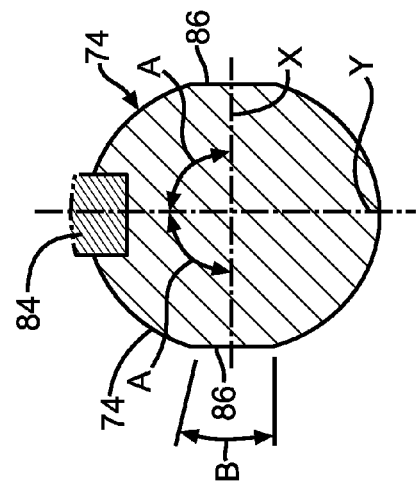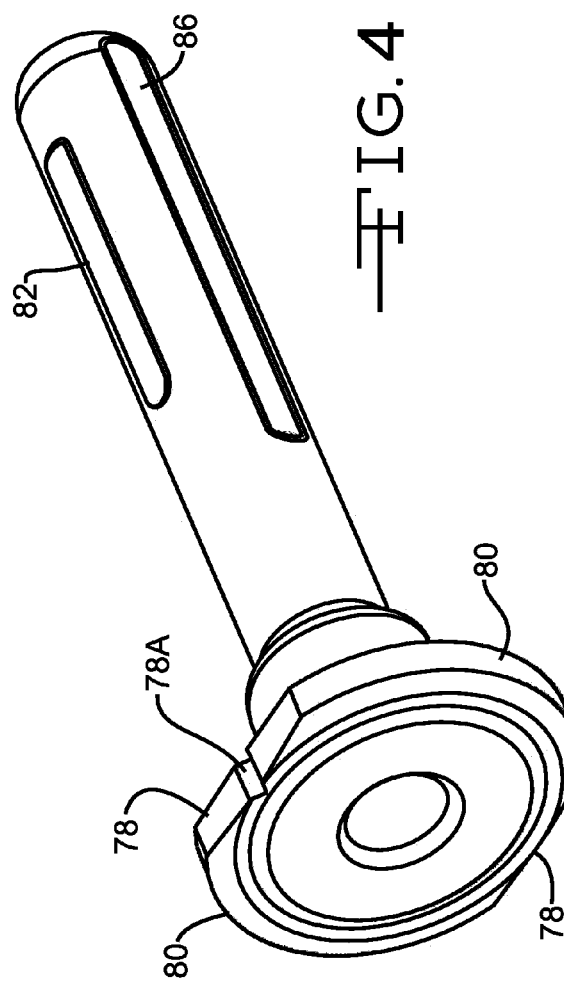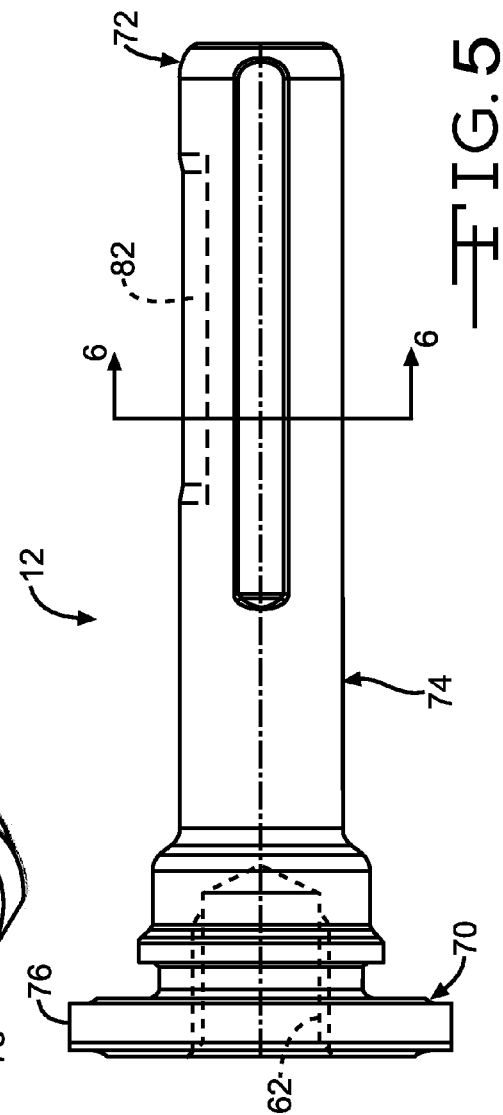

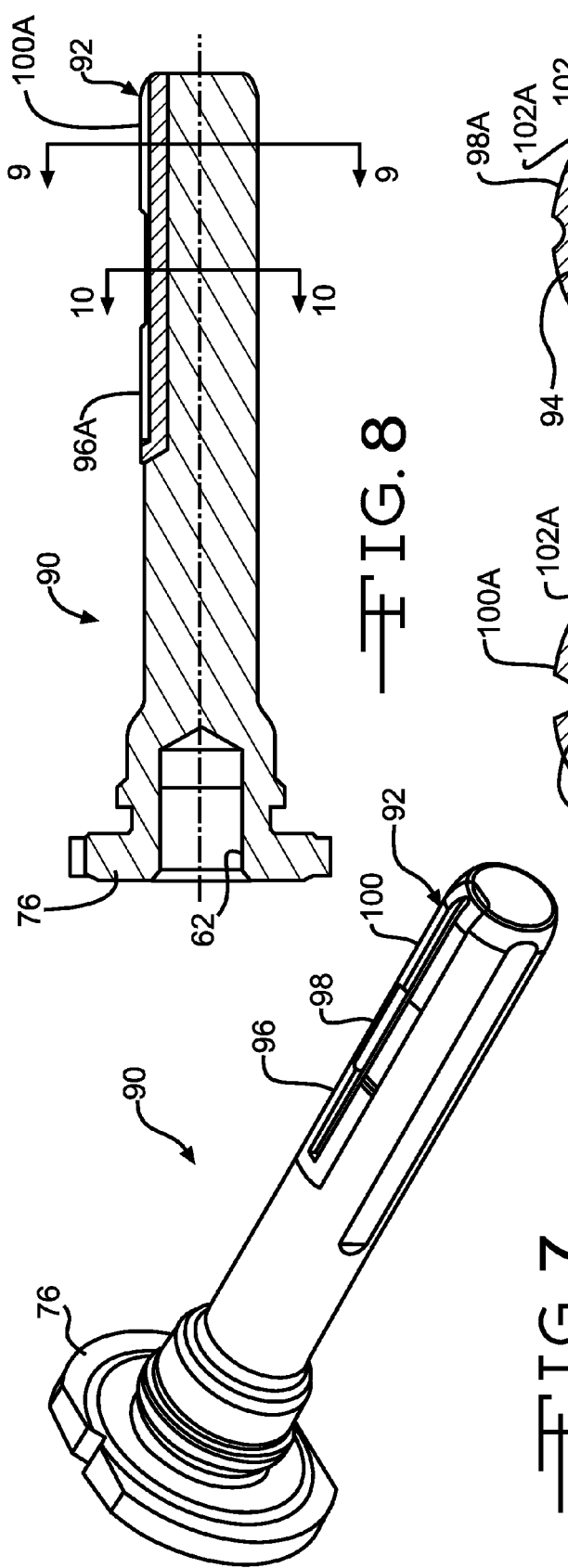
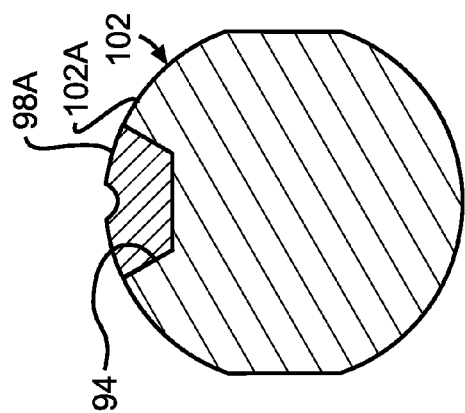
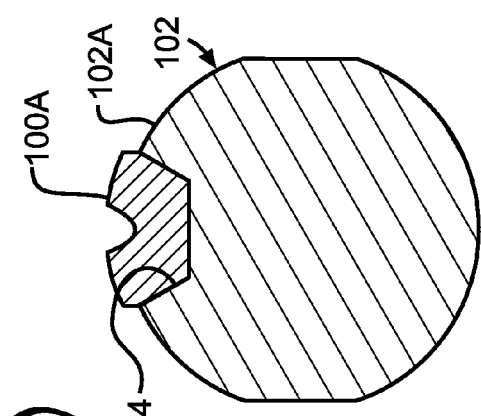
FIG.7
FIG.8
FIG.9
FIG.10

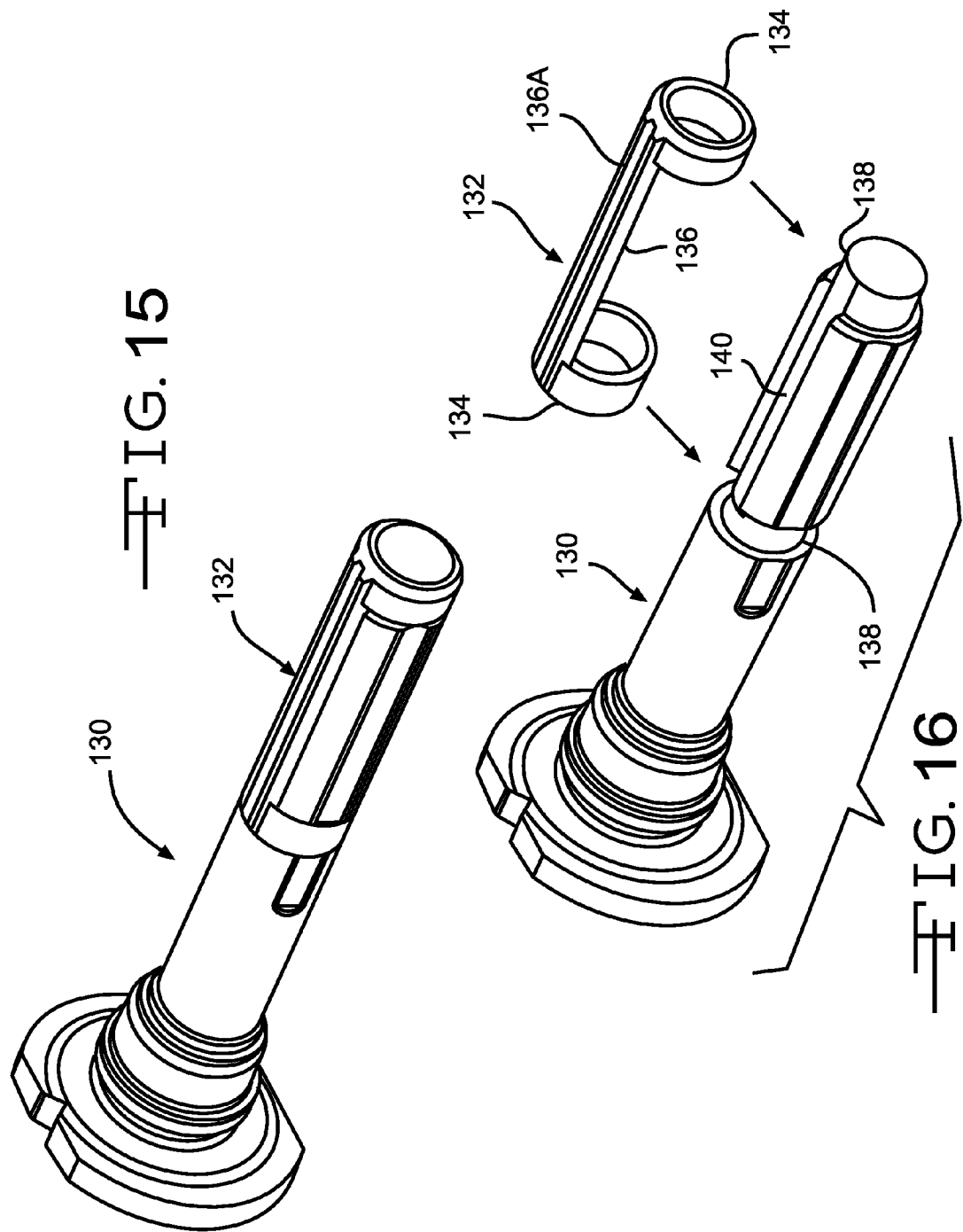

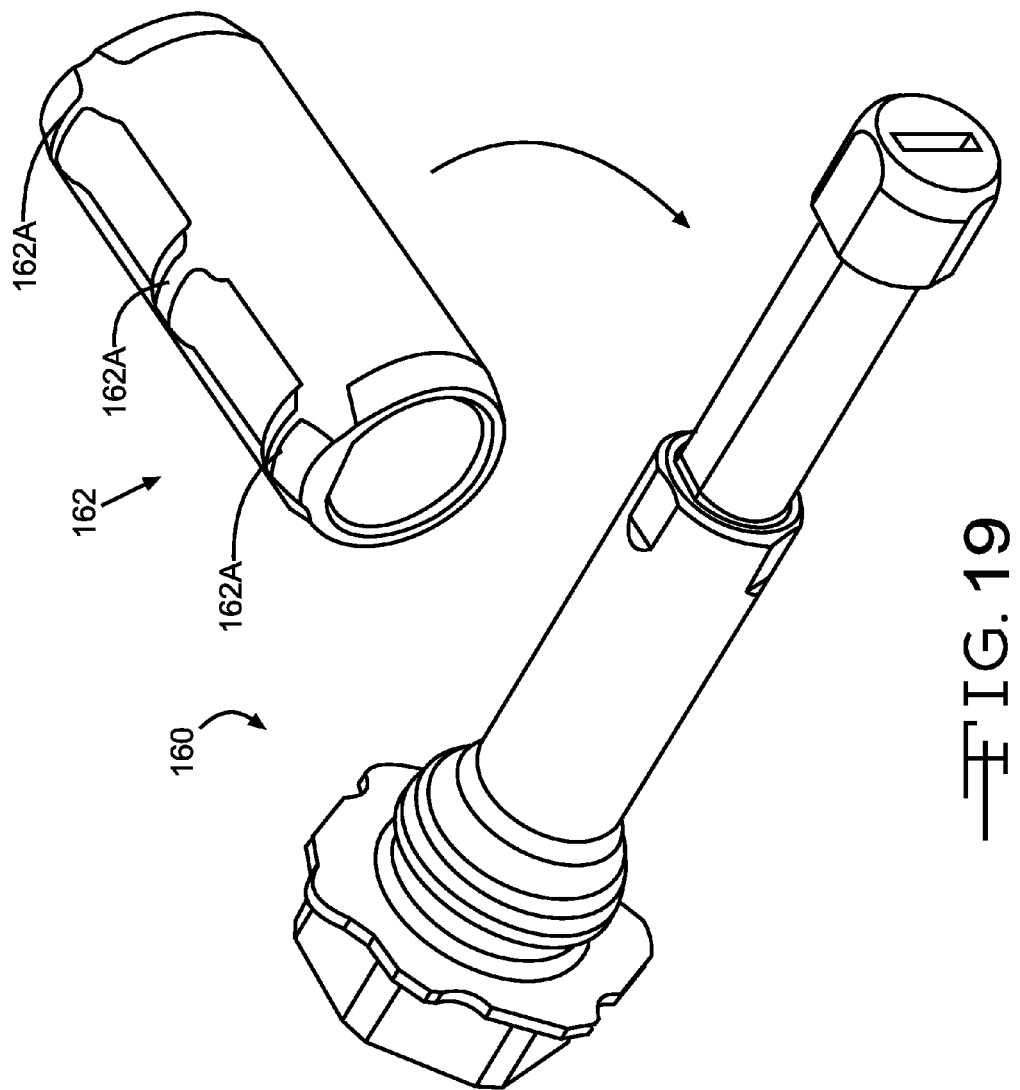

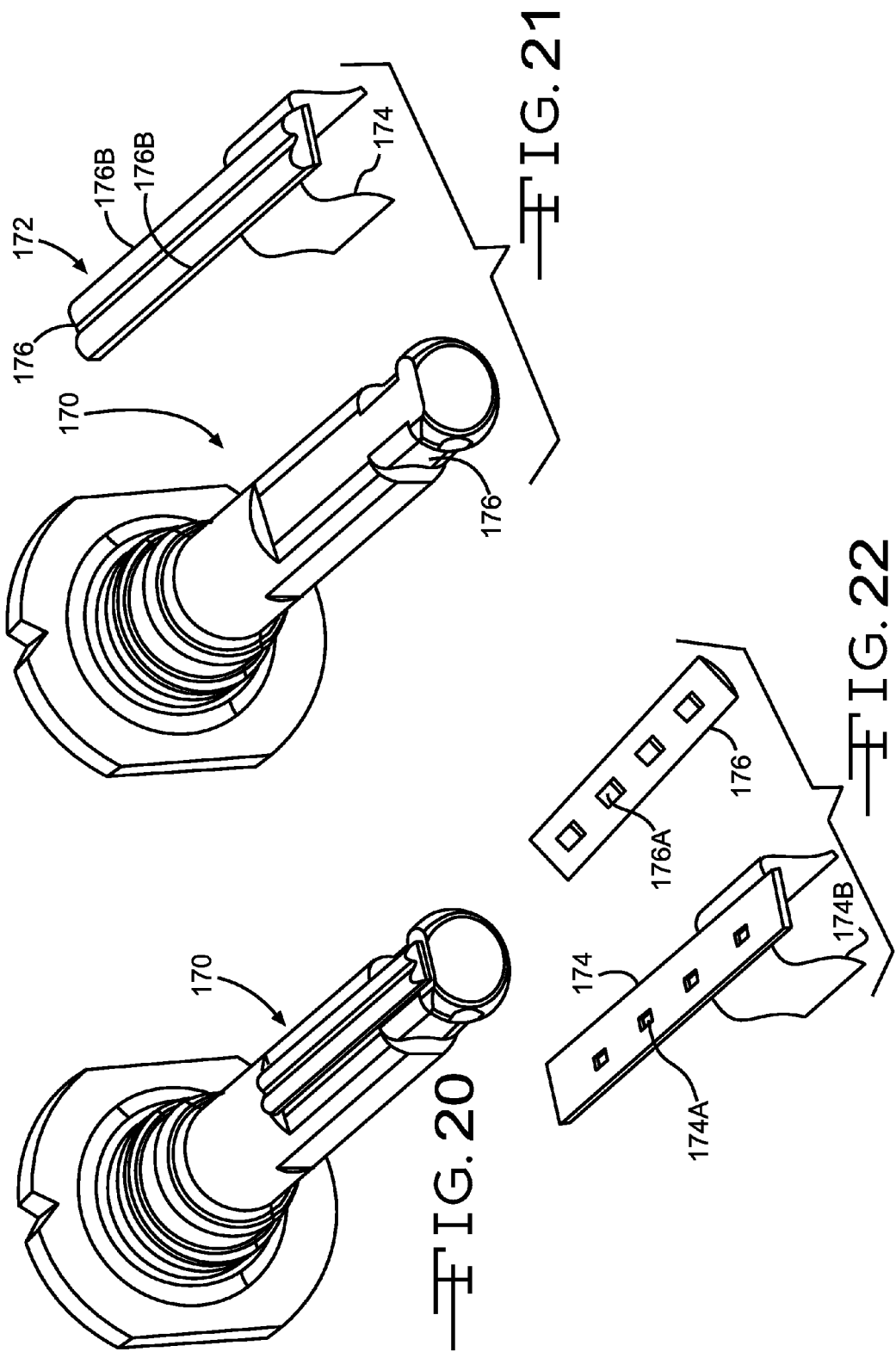

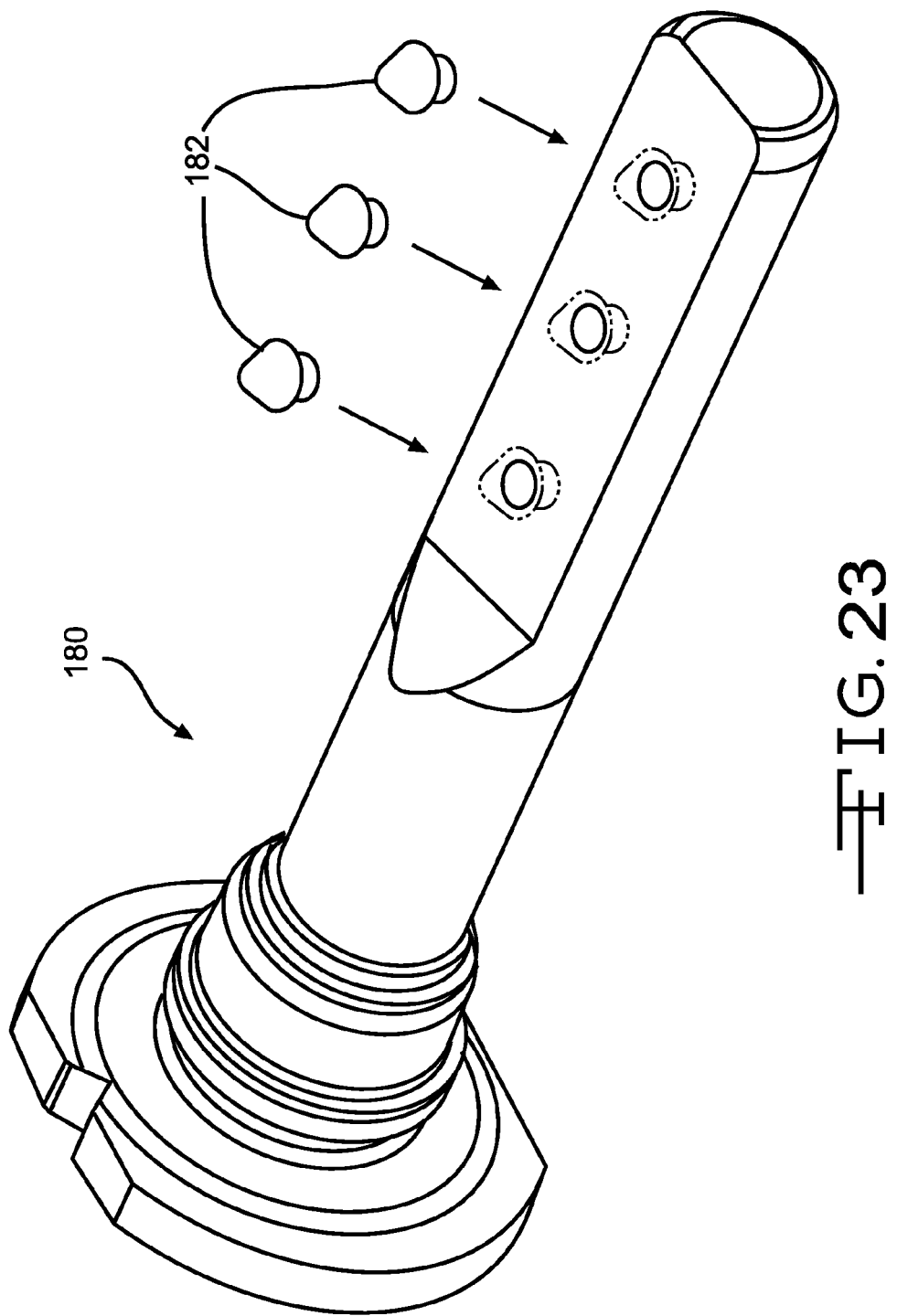

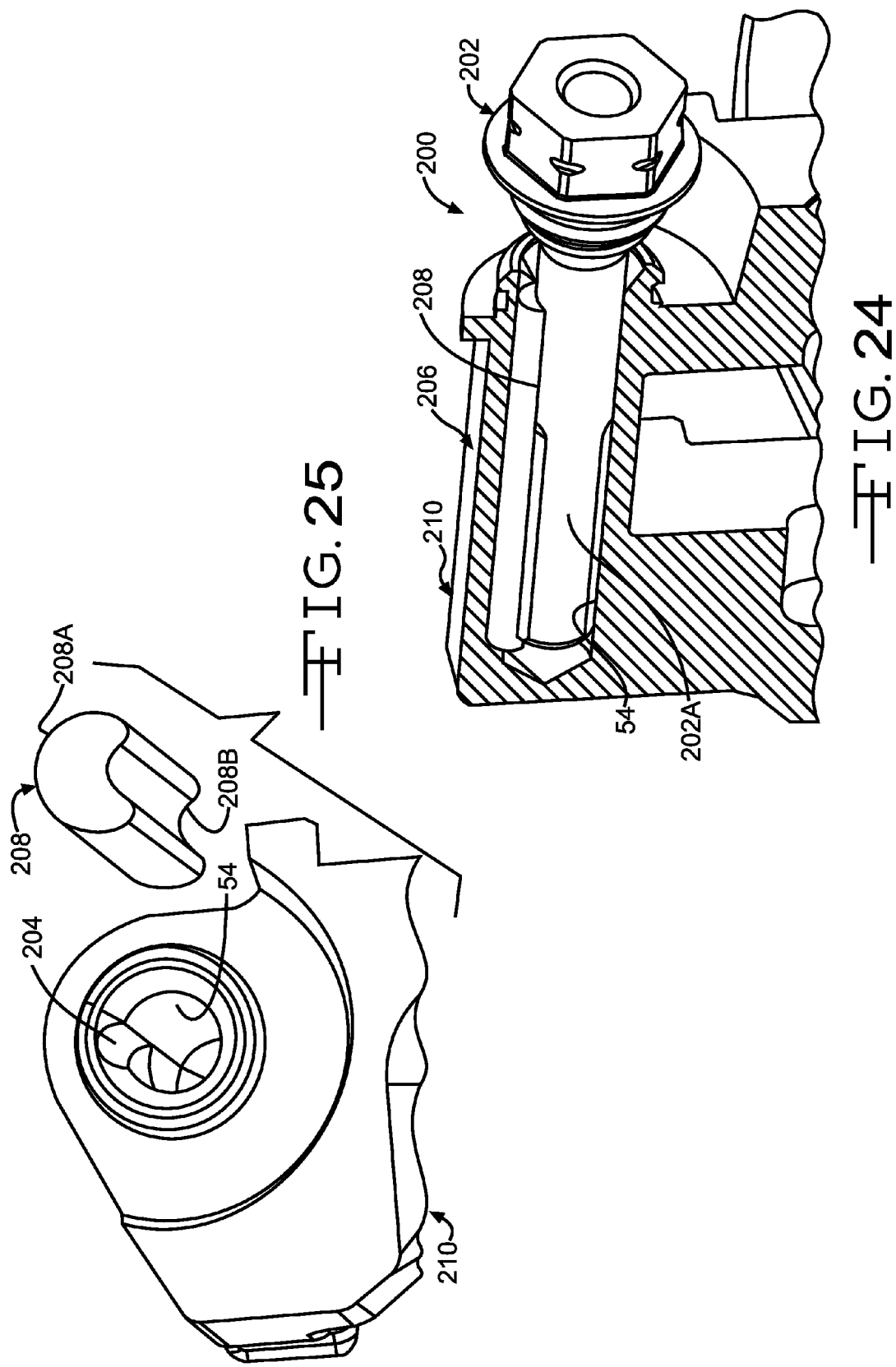

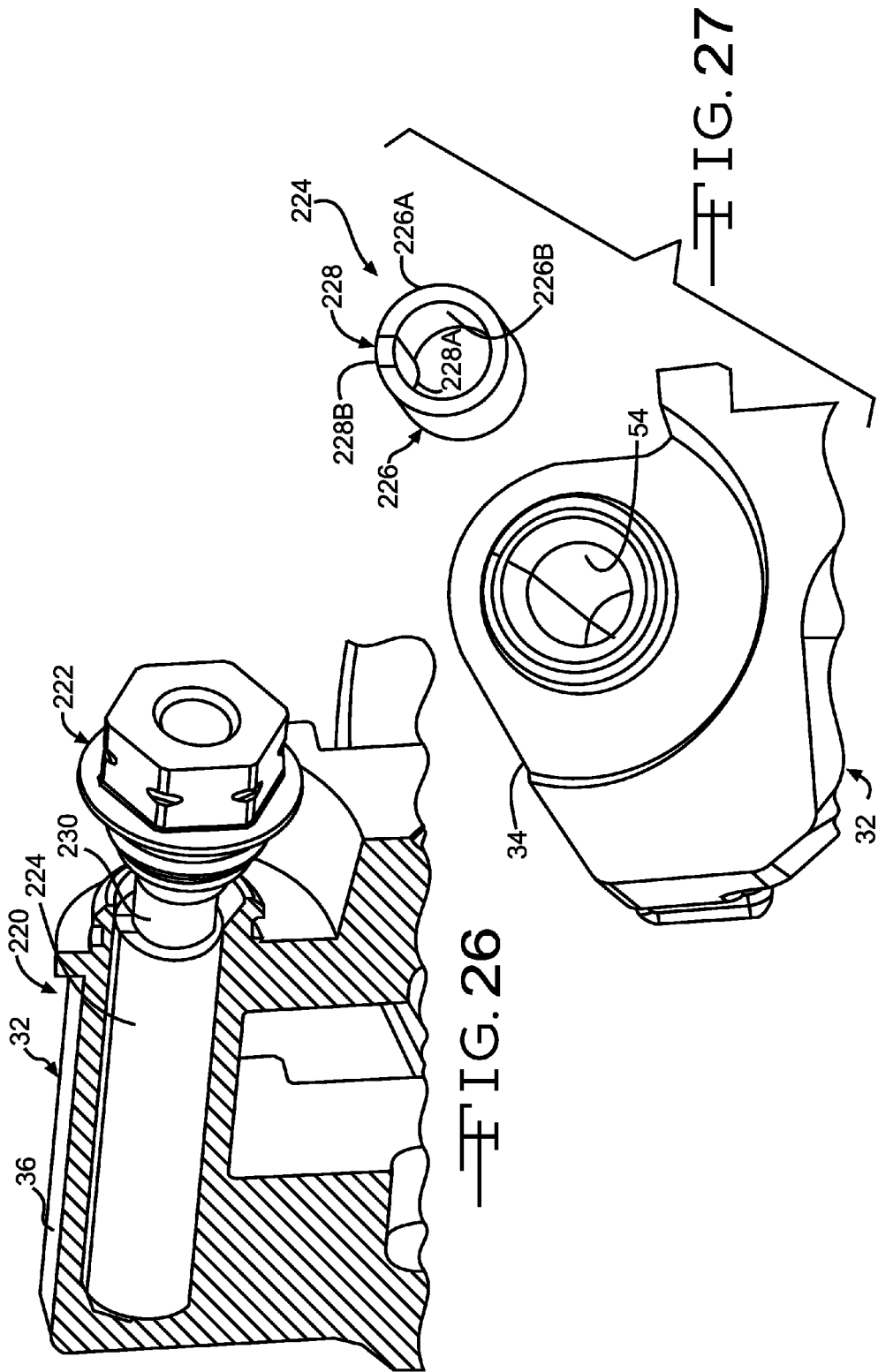

GUIDE PIN FOR DISC BRAKE ASSEMBLY AND DISC BRAKE ASSEMBLY INCLUDING SUCH A GUIDE PIN

BACKGROUND OF THE INVENTION

This invention relates in general to vehicle brake assemblies and in particular to an improved structure for a guide pin for a vehicle disc brake assembly and disc brake assembly including such a guide pin.

Most vehicles today are equipped with a brake system for retarding or stopping movement of the vehicle in a controlled manner. A typical brake system for an automobile or truck includes a disc brake assembly for each of the front wheels and either a drum brake assembly or a disc brake assembly for each of the rear wheels. The brake assemblies are typically actuated by hydraulic or pneumatic pressure generated when an operator of the vehicle depresses a brake pedal. The structures of these drum brake assemblies and disc brake assemblies, as well as the actuators therefore are well known in the art.

A typical disc brake assembly includes an anchor bracket which is secured to a fixed, non-rotatable component of the vehicle. A pair of brake shoes are supported on the anchor bracket for sliding movement relative thereto. The brake shoes have respective friction pads which are disposed on opposite sides of a brake disc. The disc, in turn, is connected to the wheel of the vehicle for rotation therewith. To effect braking action, the brake shoes are moved inwardly toward one another so as to frictionally engage the opposed sides of the disc. Such frictional engagement causes retarding or stopping of the rotational movement of the disc and, therefore, the wheel of the vehicle in a controlled manner.

To accomplish this, the disc brake assembly further includes a caliper assembly for selectively moving the brake shoes into frictional engagement with the brake disc. The caliper assembly typically includes guide pins or other components to slidably support a caliper housing relative to the fixed anchor bracket. The caliper housing is generally C-shaped, having an inboard leg disposed adjacent the inboard brake shoe and an outboard leg disposed adjacent to the outboard brake shoe. One or more hydraulically or pneumatically actuated pistons are provided in respective cylindrical recesses formed in the caliper inboard leg adjacent to the inboard brake shoe. When the brake pedal is depressed, the piston and the inboard leg of the caliper are urged apart from one another. Specifically, the piston is urged outwardly, while the outboard leg of the caliper is urged inwardly. As mentioned above, the piston is disposed adjacent to the inboard brake shoe and, therefore, urges it outwardly toward the inner side of the disc. Because the caliper is slidably mounted on the pins of the anchor bracket, the caliper outboard leg (and, thus, the outboard brake shoe disposed adjacent thereto) are urged inwardly toward the outer side of the disc. As result, the brake shoes frictionally engage the opposed sides of the disc.

SUMMARY OF THE INVENTION

This invention relates to an improved structure for a guide pin for a vehicle disc brake assembly and disc brake assembly including such a guide pin.

According to one embodiment, the disc brake assembly comprises: an anchor bracket having at least one bore formed therein, the bore defining a first axis; a brake caliper slidably secured to the anchor bracket; a pair of brake pads carried by the disc brake assembly; and at least one guide pin adapted to be disposed in the bore of the anchor bracket, the at least one guide pin defining a second axis; wherein when the at least one guide pin is disposed in the at least one bore of the anchor bracket, the second axis of the at least one guide pin is configured to be offset relative to the first axis of the at least one bore such that there is provided at least one defined point of contact between only a portion of a shank portion of the at least one guide pin and a portion of an inner surface of the at least one bore.

According to this embodiment of the disc brake assembly, the at least one spring-like member, which is formed separate from the at least one guide pin, is provided, and wherein the at least one spring-like member is operative to bias in a spring-like manner the at least one guide pin in the at least one bore thereby offsetting the second axis of the at least one guide pin relative to the first axis of the at least one bore.

According to this embodiment of the disc brake assembly, the at least one spring-like member is secured to one of the at least one guide pin and the at least one bore.

According to this embodiment of the disc brake assembly, the at least one spring-like member is formed from an elastomer material.

According to this embodiment of the disc brake assembly, the at least one spring-like member is a rubber bushing.

According to this embodiment of the disc brake assembly, the at least one spring-like member is a sheath-like member.

According to this embodiment of the disc brake assembly, the at least one spring-like member is disposed in a slot provided in the at least one guide pin.

According to this embodiment of the disc brake assembly, the at least one bore is a two-part bore including a first bore, which is configured to receive the at least one guide pin, and a second bore, which is configured to receive only at least a part of the at least one spring-like member.

According to this embodiment of the disc brake assembly, the at least one guide pin includes at least one lateral flat surface provided thereon on at least the shank portion thereof.

According to another embodiment, the disc brake assembly comprises: an anchor bracket having a pair of bores formed therein, the bore defining a first axis; a brake caliper slidably secured to the anchor bracket; a pair of brake pads carried by the disc brake assembly; and a pair of guide pins a respective one of which is adapted to be disposed in the bore of the anchor bracket, the at least one guide pin defining a second axis; wherein a pair of spring-like members, which are formed separate from the guide pins, is provided, and wherein when the guide pins are disposed in the bores of the anchor bracket, the second axis of the guide pins is configured to be offset relative to the first axis of the bores by the spring-like members such that there is provided at least one defined point of contact between only a portion of a shank portion of each of the guide pins and a portion of an inner surface of each of the bores.

According to this embodiment of the disc brake assembly, the spring-like members are secured to one of the guide pins and the bores.

According to this embodiment of the disc brake assembly, the spring-like members are formed from an elastomer material.

According to this embodiment of the disc brake assembly, the spring-like members are rubber bushings.

According to this embodiment of the disc brake assembly, the spring-like members are sheath-like members.

According to this embodiment of the disc brake assembly, the spring-like member is disposed in a slot provided in the guide pin.

According to this embodiment of the disc brake assembly, the bores are two-part bores each including a first bore, which is configured to receive the guide pins, and a second bore, which is configured to receive only at least a part of the spring-like members.

According to this embodiment of the disc brake assembly, the guide pins include at least one lateral flat surface provided thereon on at least the shank portion thereof.

According to still another embodiment, the disc brake assembly comprises: an anchor bracket having at least one bore formed therein, the bore defining a first axis; a brake caliper slidably secured to the anchor bracket; a pair of brake pads carried by the disc brake assembly; and at least one guide pin adapted to be disposed in the bore of the anchor bracket, the at least one guide pin defining a second axis; wherein a rubber bushing member, which is formed separate from the at least one guide pin, is provided, and wherein when the at least one guide pin is disposed in the at least one bore of the anchor bracket, the second axis of the at least one guide pin is configured to be offset relative to the first axis of the at least one bore by the rubber bushing member such that there is provided at least one defined point of contact between only a portion of a shank portion of the at least one guide pin and a portion of an inner surface of the at least one bore.

According to this embodiment of the disc brake assembly, the at least one spring-like member is secured to one of the at least one guide pin and the at least one bore.

According to this embodiment of the disc brake assembly, the at least one spring-like member is disposed in a slot provided in the at least one guide pin.

Other advantages of this invention will become apparent to those skilled in the art from the following detailed description of the invention, when read in light of the accompanying drawings.

BRIEF DESCRIPTION OF THE DRAWINGS

FIG. 2 is a view of a portion of the vehicle disc brake assembly illustrated in FIG. 1.

FIG. 3 is a sectional view taken along line 3-3 of FIG. 2.

FIG. 3A is a view similar to FIG. 3 showing a further embodiment of a guide pin constructed in accordance with the present invention.

FIGS. 4-6 are selected views of the guide pin illustrated in FIGS. 1-3.

FIGS. 7-10 are selected views of a second embodiment of a guide pin constructed in accordance with the present invention.

FIGS. 15-16 are selected views of a fifth embodiment of a guide pin constructed in accordance with the present invention.

FIG. 19 is an exploded perspective view of a seventh embodiment of a guide pin constructed in accordance with the present invention.

FIGS. 20-22 are selected views of an eighth embodiment of a guide pin constructed in accordance with the present invention.

FIG. 23 is an exploded perspective view of a ninth embodiment of a guide pin constructed in accordance with the present invention.

FIG. 24 is a perspective view, partially cut away, of a portion of a second embodiment of a vehicle disc brake assembly, including a tenth embodiment of a guide pin, constructed in accordance with the present invention.

FIG. 25 is an exploded perspective view of a portion of the vehicle disc brake assembly illustrated in FIG. 24.

FIG. 26 is a perspective view, partially cut away, of a portion of a third embodiment of a vehicle disc brake assembly, including an eleventh embodiment of a guide pin, constructed in accordance with the present invention.

FIG. 27 is an exploded perspective view of a portion of the vehicle disc brake assembly illustrated in FIG. 26.

DETAILED DESCRIPTION OF THE PREFERRED EMBODIMENTS

Figure 1:
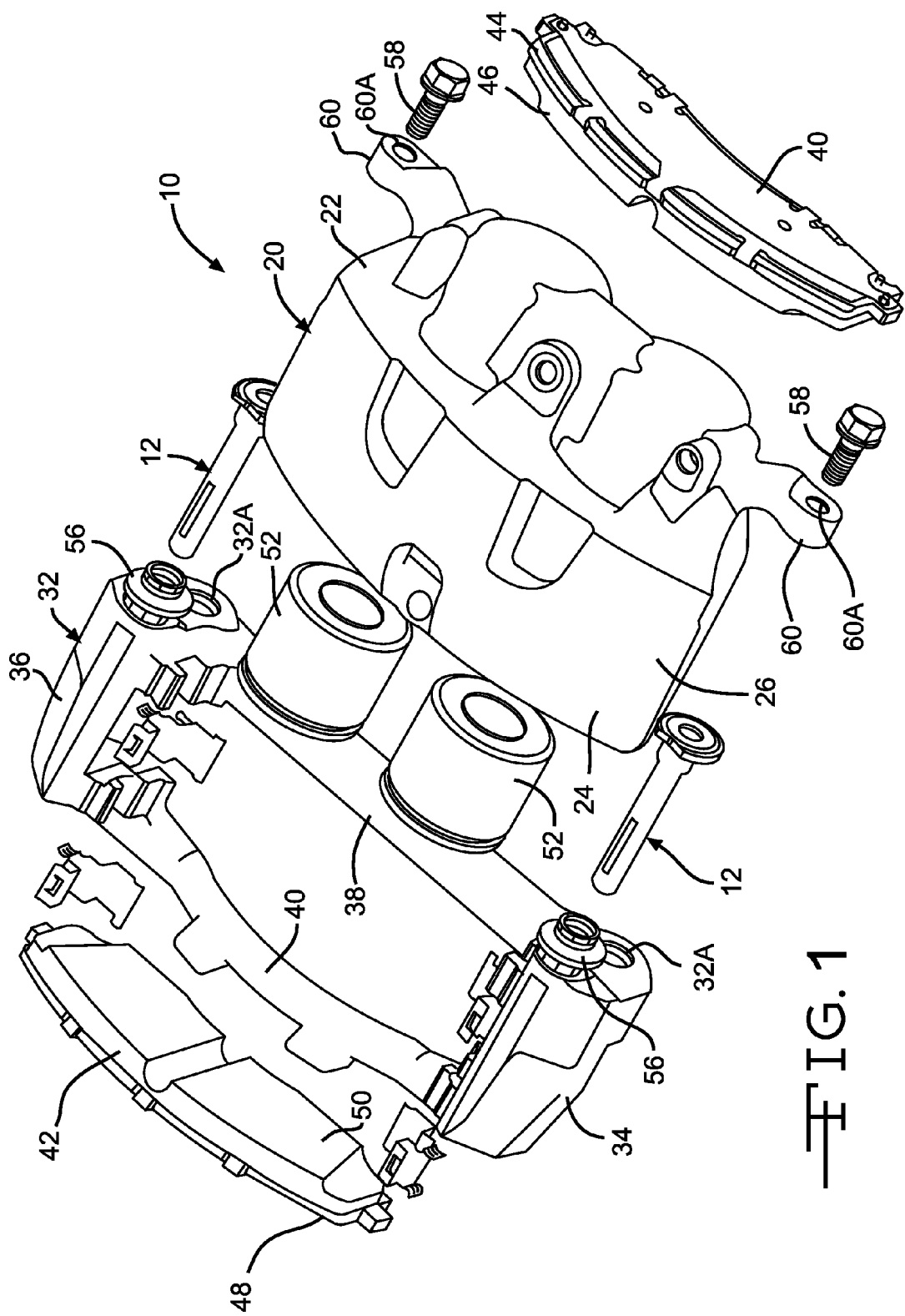
FIG. 1 is an exploded perspective view of a portion of a first embodiment of a vehicle disc brake assembly, including a first embodiment of a guide pin, constructed in accordance with the present invention.

Referring now to FIG. 1, there is illustrated a portion of a vehicle disc brake assembly, indicated generally at 10, including an embodiment of a guide pin, indicated generally at 12, in accordance with the present invention. The general structure and operation of the prior art disc brake assembly 10 is conventional in the art. Thus, only those portions of the prior art disc brake assembly 10 which are necessary for a full understanding of this invention will be explained and illustrated. Also, although this invention will be described and illustrated in connection with the particular disc brake assembly 10 disclosed herein, it will be appreciated that this invention may be used in connection with other types or kinds of disc brake assemblies, such as for example, as generally shown in U.S. Pat. No. 8,051,958 to Rockwell et al., U.S. Pat. No. 6,039,156 to Schneider, and U.S. Pat. No. 5,927,446 to Evans, the disclosures of each of these patents incorporated herein by reference in their entirety, and/or in connection with other types of kinds of "pin guided" or "pin sliding" disc brake assemblies, if so desired.

As shown in the illustrated embodiment of FIG. 1, the disc brake assembly 10 is a pin guided or pin sliding type of disc brake assembly and includes a generally C-shaped caliper, indicated generally at 20. The caliper 20 includes an inboard leg portion 22 and an outboard leg portion 24 which are interconnected by an intermediate bridge portion 26. The caliper 20 is slidably supported on a pair of the guide pins 12 which are secured to an anchor bracket, indicated generally at 32. The anchor bracket 32 is, in turn, secured to a stationary component of the vehicle by suitable fasteners, such as for example bolts (not shown), which extend through openings 32A provided in the anchor bracket 32. Such a stationary component can be, for example, an axle flange (not shown), when the disc brake assembly 10 is installed for use on the rear of the vehicle, or a steering knuckle (not shown), when the disc brake assembly 10 is installed for use on the front of the vehicle.

In the illustrated embodiment, the anchor bracket 32 includes a pair of axially and outwardly extending arms 34 and 36 which are interconnected at their inboard ends by an inner tie bar 38 and which are interconnected at their outboard ends by an outer tie bar 40. The arms 34 and 36 each have a pair of generally C-shaped channels 38 formed thereon. The channels 38 are provided to slidably support an inboard brake shoe, indicated generally at 40, and an outboard brake shoe, indicated generally at 42, thereon. Alternatively, the construction and/or configuration of the anchor bracket 32 may be other than illustrated and described if so desired.

In the illustrated embodiment, the inboard brake shoe 40 includes a backing plate 44 and a friction pad 46. The inboard backing plate 44 includes opposed ends having tabs or protrusions 44A formed thereon, for supporting the inboard brake shoe 40 in the channels 38 of the anchor bracket 32. The outboard brake shoe 42 includes a backing plate 48 and a friction pad 50. The outboard backing plate 48 includes opposed ends having tabs or protrusions 48A formed thereon, for supporting the outboard brake shoe 32 in the channels 38 of the anchor bracket 32. Alternatively, the construction and/or supporting of one or both of the brake shoes 40 and 42 may be other than illustrated and described if so desired. For example, the inboard brake shoe 40 can be supported on a brake piston/pistons 52 of the disc brake assembly 10, and/or the outboard brake shoe 42 can be supported on the outboard leg portion 24 of the caliper 20.

In the illustrated embodiment, an actuation means (not shown) is provided for effecting the operation of the disc brake assembly 10. In the illustrated embodiment, the actuation means includes the pair of brake pistons 52 each of which is disposed in a counterbore or recess (not shown), formed in an outboard surface of the inboard leg 22 of the caliper 20. The actuation means can be hydraulic, electrical, pneumatic, and mechanical types.

As shown in FIG. 1, each of the guide pins 12, which will be discussed below in detail, is disposed in a non-threaded bore 54 (shown in FIGS. 2 and 3), provided in each of the arms 34 and 36 of the anchor bracket 32. A boot seal 56 is preferably installed in each of the opening 54 through which each of the guide pins 12 extend. A pair of threaded fasteners 58 are provided to slidably secure the caliper 20 to the anchor bracket 32. The fasteners 58 extend through openings 60A provided in lugs or ears 60 of the caliper 20 and are installed in an internally threaded bore 62 (shown in FIG. 5), provided in each guide pin 12.

Turning now to FIGS. 2-6, the construction of the first embodiment of the guide pin 12 will be discussed in detail. In the illustrated embodiment, each of the guide pins 12 is preferably identical to one another and includes a first end, indicated generally at 70, which defines a head portion. The guide pin 12 further includes a second end, indicated generally at 72, which defines a lead-in portion, and a center section, indicated generally at 74, which defines a shank portion.

In the illustrated embodiment, the head 70 preferably includes the internally threaded bore 62 provided therein. The head 70 preferably further includes a flange 76 having a pair of opposed planar or flat surfaces 78 provided thereon and a pair of arcuate surfaces 80 disposed between the opposed flat surfaces 78. In the illustrated embodiment, one of the flat surfaces 78 preferably includes an indicia or other suitable identifying feature 78A provided therein or thereon for a purpose to be discussed below. In the illustrated embodiment, the indicia 78A is V-shaped notch provided in one of the flat surfaces 78. Alternatively, the construction and/or configuration of the head 70 may be other than illustrated and described if so desired. For example, the head 70 would not have the internally threaded bore if stud type guide pins are used.

Figure 32:
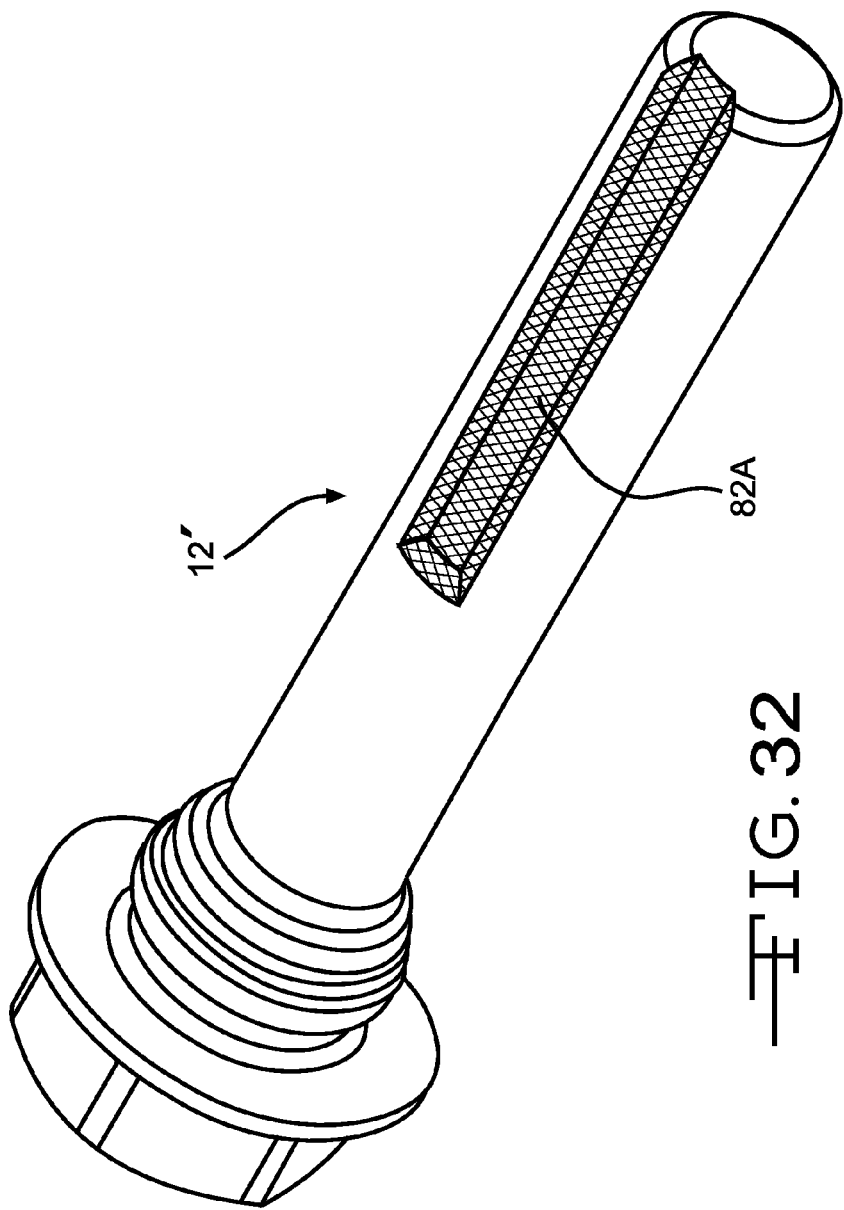
FIG. 32 is a perspective view of a portion of a thirteenth embodiment of a guide pin constructed in accordance with the present invention.

In the illustrated embodiment, the shank portion 74 is annular, defines a first axis Y and a second axis X, and preferably includes a slot or recess 82 provided therein along at least a portion thereof. Preferably, as illustrated, the slot 82 and the indicia 78A are in alignment with one another so that the orientation of the guide pin 12 in the bore 54 of the caliper 12 can be set to a desired predetermined orientation therewithin. The slot 82 is configured to receive a "spring-like" bushing or member 84 therein for a purpose to be discussed below. In the illustrated embodiment, the member 84 is preferably an elastomeric or rubber member and is preferably permanently attached to the guide pin 12 by suitable means, such as for example, by bonding, gluing or the like. To assist in the securing of the member 84 in the slot 82, the slot 82 can be provided with a knurled surface, such as for example shown in FIG. 32 by reference number 82A in connection with an embodiment of a guide pin 12', if so desired. As shown in FIG. 6, when the member 84 is secured to the guide pin 12 a portion of the member 84 extends outwardly from the slot 82 beyond an outer diameter surface 74A of the shank portion 74 of the guide pin 12 for a purpose to be discussed below. However, the member 84 can be formed from other suitable materials which are operative to provide a spring-like biasing effect. For example, such other suitable materials can include a metal material which preferably can be riveted, welded, pressed in or otherwise attached, and/or can be a plastic or metal insert or spring-like member.

In the illustrated embodiment, the guide pin 12 preferably further includes a pair of "lateral flat" surfaces or features 86 provided thereon. In the illustrated embodiment, the flat surfaces 86 are preferably formed so as to extend from near the second end 72 and toward the first end 70 so as to be provided in a substantial portion of the shank portion 74 of the guide pin 12. Preferably, as shown in the illustrated embodiment, the flat surfaces 86 are each spaced at a same angle A relative to a first axis Y of the guide pin 12 (which axis Y is also a center axis of the slot 82), and each flat surface 86 extends a predetermined angular distance B. In the illustrated embodiment, the angle A is approximately 90 degrees and the angular distance B is approximately 40 degrees. Alternatively, the construction of the guide pin 12 may be other than illustrated and described if so desired. For example, the configuration, number, location and/or orientation of one or more of the first end 70, the second end 72, the shank portion 74, the recess 82, the flat surfaces 86, and/or the angles A and/or B may be other than illustrated and described if so desired.

As best shown in FIG. 3, when the disc brake assembly is fully assembled and the guide pin 12 is in the installed normal position, the member 84 is configured to engage only a portion of the bore 54 and to be compressed within the bore 54 so as to be operative to offset the axis X of the guide pin 12 relative to an axis X1 of the bore 54 a distance D. In the illustrated embodiment, the distance D is preferably in the range from about 0.05 mm to about 0.15 mm.

At the same time, the member 84 is operative to bias—in a spring-like manner—only a portion 74B of an outer surface of the shank portion 74 of the guide pin 12 in "defined" contact with the bore 54. As used herein, the term "defined contact" or "defined point of contact" means a defined point, line or area of contact defined between the portion 74B of the shank portion 74 and a portion of the bore 54. In the illustrated embodiment, the defined contact between the portion 74B and the bore 54 extends an angular distance C. The angular distance C is preferably in the range from about 1-2 degrees to about 88-89 degrees. More preferably, the range is from about 15 degrees to about 60 degrees. Even more preferably the range is from about 30 degrees to about 45 degrees.

Alternatively, the construction of the guide pin 12 and/or associated parts of the disc brake assembly 10 may be other than illustrated and described if so desired. For example, the configuration, number, location and/or orientation of one or more of the first end 70, the second end 72, the shank portion 74, the recess 82, the flat surfaces 86, the angles A, B and/or C, and/or the distances D, D1 and/or D2 may be other than illustrated and described, if so desired. For example, the member 84 may be formed from other materials so long as the material is operative to provide a spring-like or similar biasing feature to that of the rubber material. Also, more than one member 84 can be provided and/or more than one defined points of contact can be provided between the associated surfaces of the guide pin and the bore. FIG. 3A shows an embodiment having two members M and two defined points of contact C. Thus, as can be readily understood, there are many different configurations possible having at least one or more of such members M and one or more of such defined points of contact C. Also, as can be readily understood, the present invention can be used in connection with other attachment styles of guide pins if so desired.

Also, as can be seen in FIG. 3, the member 84 is operative to provide a first or "radial" guide pin clearance D1 between the bore 54 and the outer diameter surface 74A of the shank portion 74 of the guide pin 12. The clearance D1 is preferably in the range from about 0.10 mm to about 0.30 mm. Further, a second or "tangential" guide clearance D2 is provided between the flat surfaces 86 of the shank portion 74 of the guide pin 12 and the bore 54. The clearance D2 is preferably in the range from about 0.05 mm to about 0.15 mm.

Alternatively, the construction of the guide pin 12 and/or associated parts of the disc brake assembly 10 may be other than illustrated and described if so desired. For example, the configuration, number, location and/or orientation of one or more of the first end 70, the second end 72, the shank portion 74, the recess 82, the flat surfaces 86, the angles A, B and/or C, and/or the distances D, D1 and/or D2 may be other than illustrated and described, if so desired.

Turning now to FIGS. 7-10 and using like reference numbers to indicate corresponding or similar parts, there is illustrated a second embodiment of a guide pin, illustrated generally at 90. As shown in this embodiment, a member 92 is disposed and secured in a slot 94 provided in the guide pin 90. The member 92 includes a segmented body preferably having a first end portion 96, at least one intermediate portion 98, and a second end portion 100. Preferably, the at least one intermediate portion 98 is provided to function to retain and distribute a lubrication grease or fluid which is preferably provided. Also, the intermediate portion 98 provides a "circumferential" path of grease flow during "high" anchor bracket deflection and contains the grease to maintain a lubrication in the path of the members 92 as the associated guide pins 90 extend from the bore to accommodate pad wear.

As can best seen in FIG. 9, the second end portion 100 includes an outer surface 100A which extends outwardly and beyond an outer surface 102A of the shank portion 102 of the guide pin 90 prior to assembly. Similarly, the first end portion 96 includes an outer surface 96A which extends outwardly and beyond an outer surface 102A of the shank portion 102 of the guide pin 90 prior to assembly. The intermediate portion 98 includes an outer surface 98A which is generally complimentary to the outer surface 102A of the shank portion 102 of the guide pin 90 prior to assembly. As can be readily understood, the outer surfaces 96A and 100A of the member 92 are configured to contact a portion of the bore of the arm of the associated anchor bracket to provide a spring-like biasing effect as described above in connection with the guide pin 12 which offsets the axis of the guide pin relative to the bore and thereby produces a defined point of contact between only a portion of an outer surface of the guide pin and the bore.

Further, in the illustrated embodiment, a notch or V-shaped groove is preferably provided along in the member 92 along the associated outer surfaces 96A, 98A and 100A thereof. As can be readily understood, the function and operation of the guide pin 90 is similar to that of the guide pin 12 discussed above. Alternatively, the construction of the guide pin 90 may be other than illustrated and described if so desired.

Figure 11:
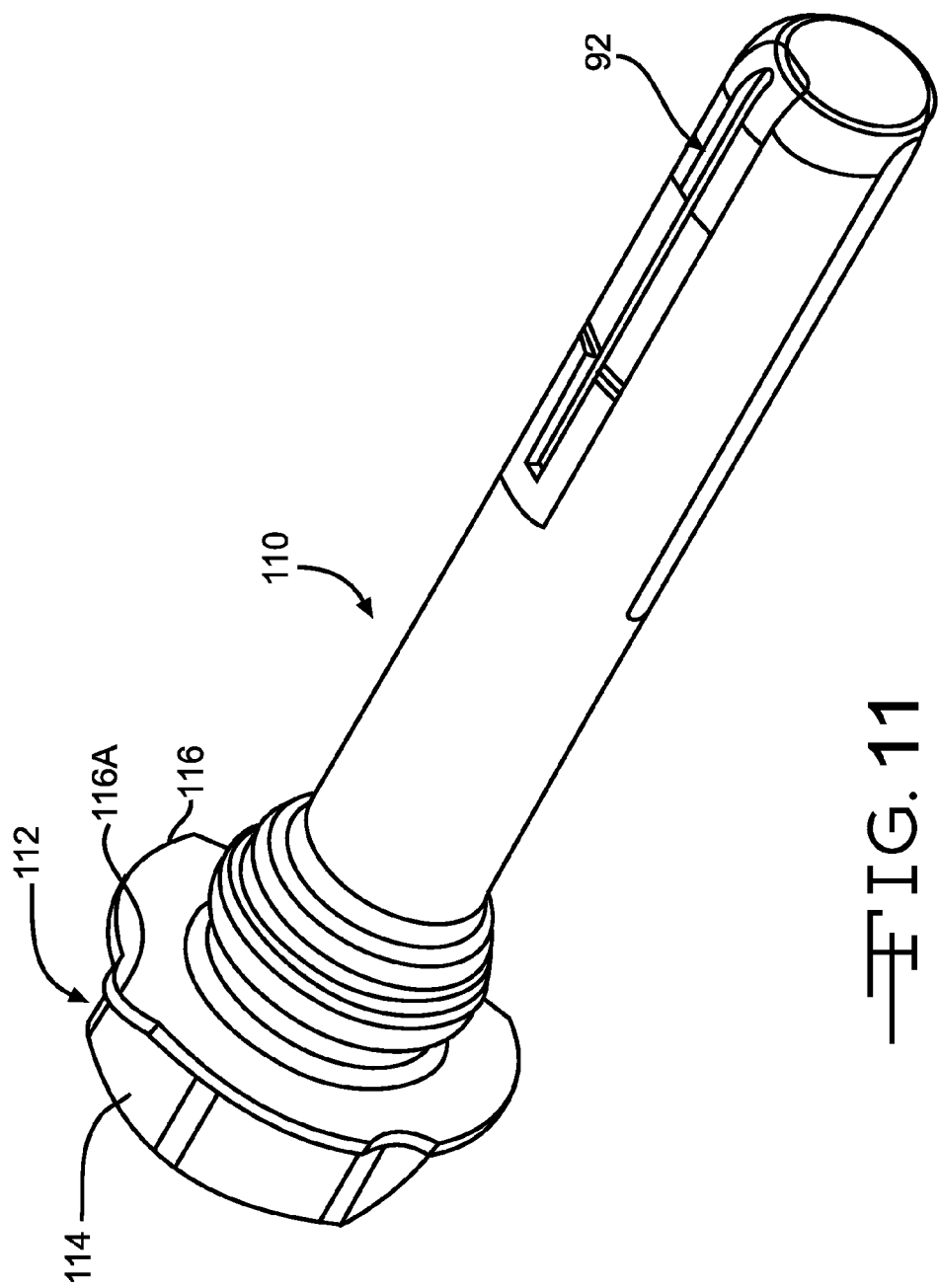
FIG. 11 is a perspective view of a third embodiment of a guide pin constructed in accordance with the present invention.

Turning now to FIG. 11 and using like reference numbers to indicate corresponding or similar parts, there is illustrated a third embodiment of a guide pin, illustrated generally at 110. This embodiment is similar to the guide pin 90 illustrated in FIGS. 7-10 except that in this embodiment a first end 112 of the guide pin 110 is provided with a hexagonal-shaped head 114 and a flange 116 is provided thereon. The flange 116 is provided with an indicia 116A, illustrated as being a raised tab, with the tab 116A being aligned with the member 92. As can be readily understood, the function and operation of the guide pin 110 is similar to that of the guide pin 12 discussed above. Alternatively, the construction of the guide pin 110 may be other than illustrated and described if so desired.

Figure 13:
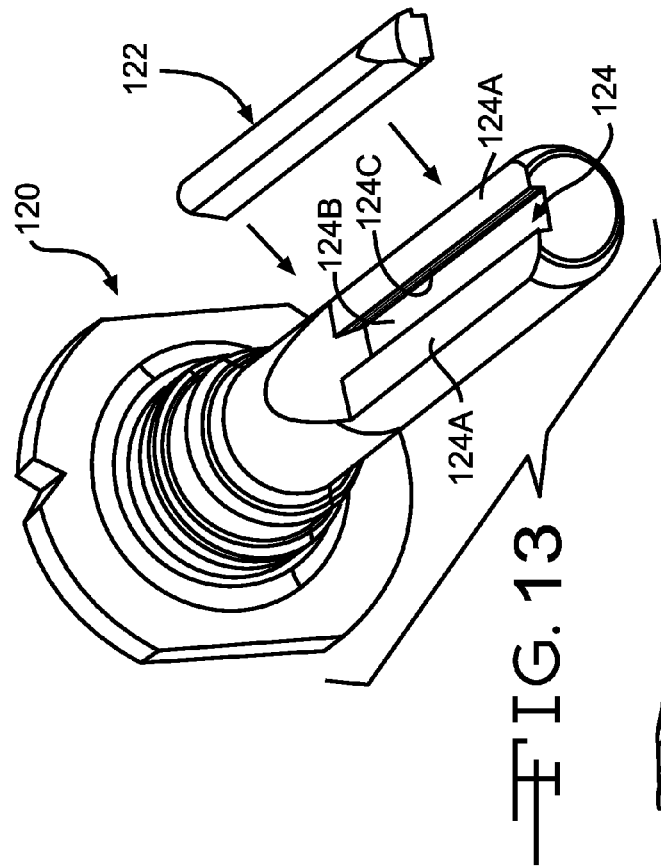
FIGS. 12-14 are selected views of a fourth embodiment of a guide pin constructed in accordance with the present invention.
Figure 14:
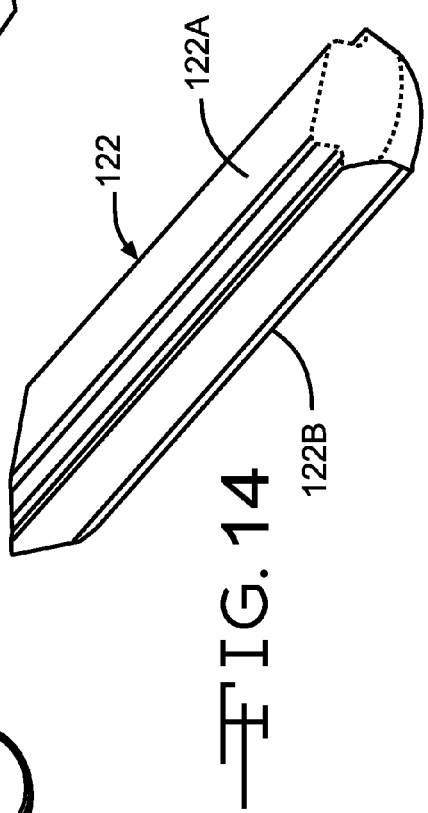
Figure 12:
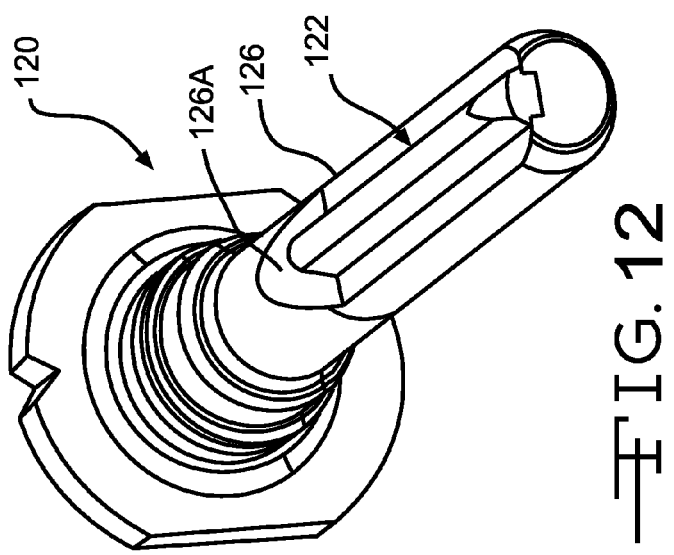

Turning now to FIGS. 12-14 and using like reference numbers to indicate corresponding or similar parts, there is illustrated a fourth embodiment of a guide pin, illustrated generally at 120. As shown in this embodiment, a member 122 is disposed and secured in a slot 124 provided in the guide pin 120. The member 122 includes a first "inner" portion 122A, configured to be disposed and secured in the slot 124, and a second "outer" portion 122B, configured to contact a portion of the bore of the arm of the associated anchor bracket to provide a spring-like biasing effect as described above in connection with the guide pin 12 which offsets the axis of the guide pin relative to the bore and thereby produces a defined point of contact between only a portion of an outer surface of the guide pin and the bore.

The slot 124 includes a pair of opposed spaced flat or planar surfaces 124A and a flat or planar surface 124B which is located between and recessed relative to the surfaces 124A. The side walls 124C of the slot 124 can be slightly tapered inwardly as illustrated to assist in the retention of the member 122 therewithin if so desired. As can be seen best in FIG. 14, the member 122 is provided with a portion 122A which is shaped complimentary to that of the slot 124. As can be readily understood, the exact geometry of the slot 124, and therefore of the member 124, can be readily modified to accommodate manufacturing.

Also, as shown, a portion 126A of a shank portion 126 of the guide pin 120 can be tapered or angled to facilitate the molding of the member 122 to the guide pin 120 if so desired. As can be readily understood, the function and operation of the guide pin 120 is similar to that of the guide pin 12 discussed above. Alternatively, the construction of the guide pin 120 may be other than illustrated and described if so desired.

Turning now to FIGS. 15 and 16 and using like reference numbers to indicate corresponding or similar parts, there is illustrated a fifth embodiment of a guide pin, illustrated generally at 130. As shown in this embodiment, a member 132 includes a pair of opposed ring portions 134 interconnected by an intermediate body "strip" portion 136. The rings portions 134 are configured to be disposed and secured in annular slots 138 formed in the guide pin 130, and the body portion 136 is configured to be disposed in a slot 140 provided in the guide pin 130.

As can be readily understood, at least an outer surface 136A of the body portion 136 of the member 132 is configured to contact a portion of the bore of the arm of the associated anchor bracket to provide a spring-like biasing effect as described above in connection with the guide pin 12 which offsets the axis of the guide pin relative to the bore and thereby produces a defined point of contact between only a portion of an outer surface of the guide pin and the bore. As can be readily understood, the function and operation of the guide pin 130 is similar to that of the guide pin 12 discussed above. Alternatively, the construction of the guide pin 130 may be other than illustrated and described if so desired.

Figure 18:
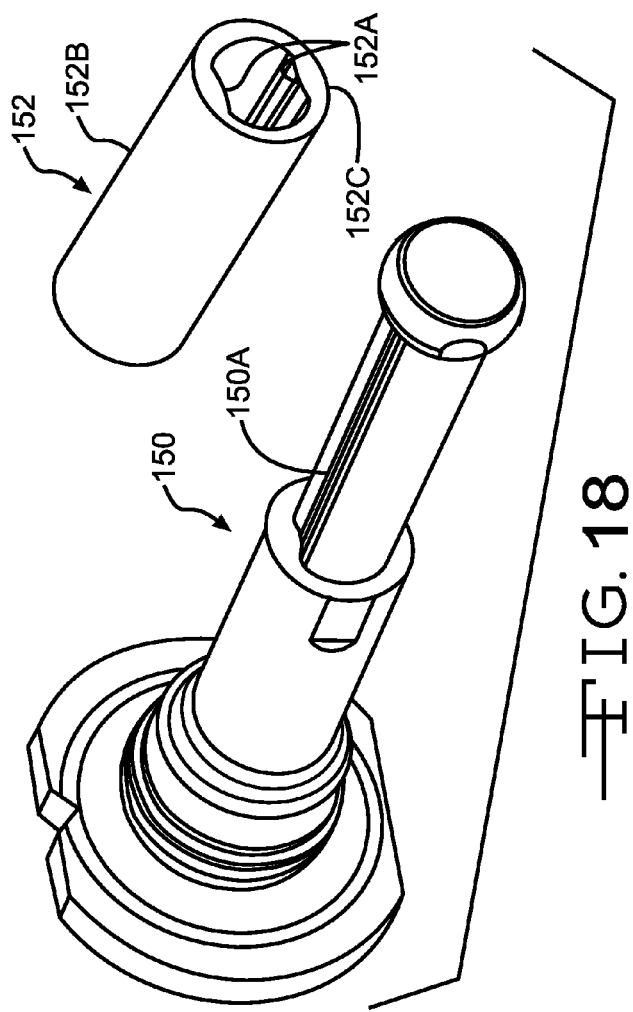
FIGS. 17-18 are selected views of a sixth embodiment of a guide pin constructed in accordance with the present invention.
Figure 17:
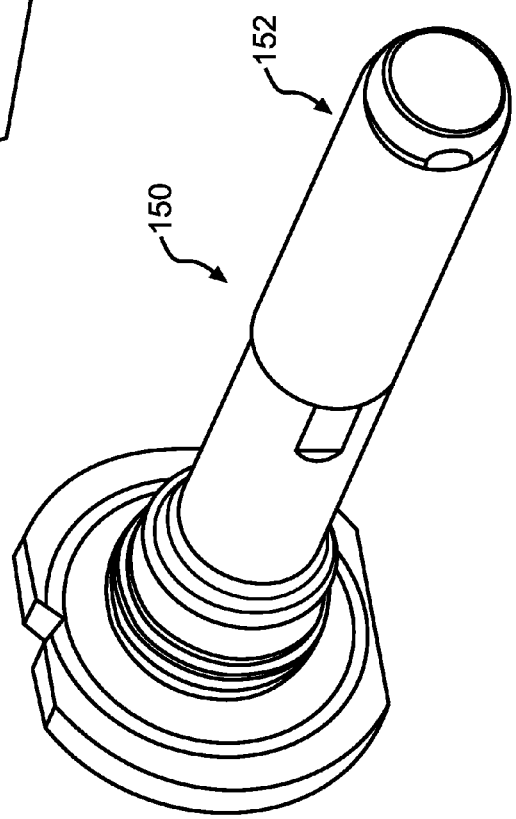
Figure 29:
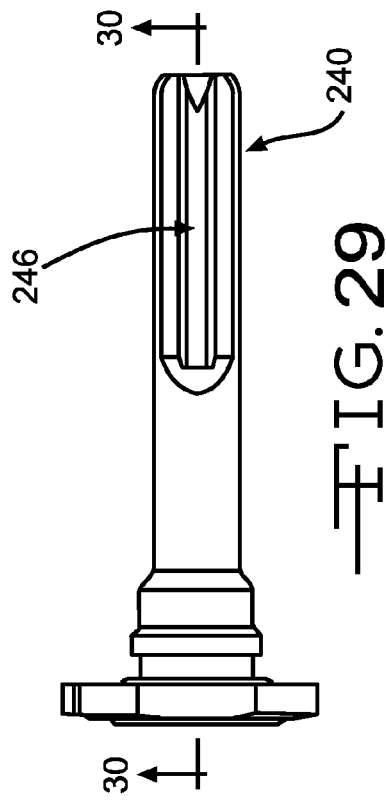
FIGS. 28-31 are selected views of a twelfth embodiment of a guide pin constructed in accordance with the present invention.
Figure 31:
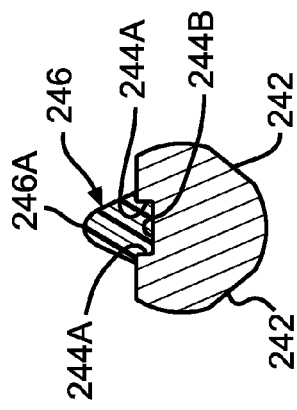
Figure 28:
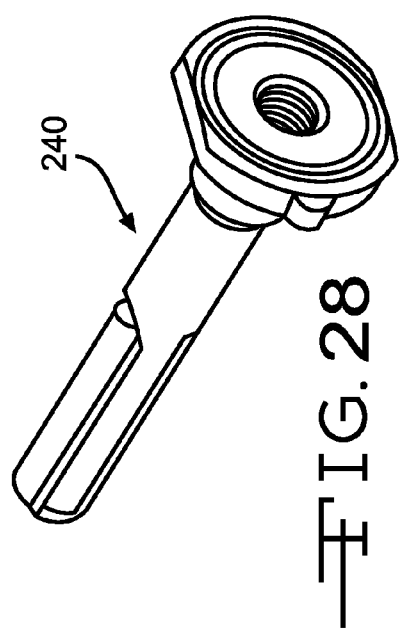
Figure 30:
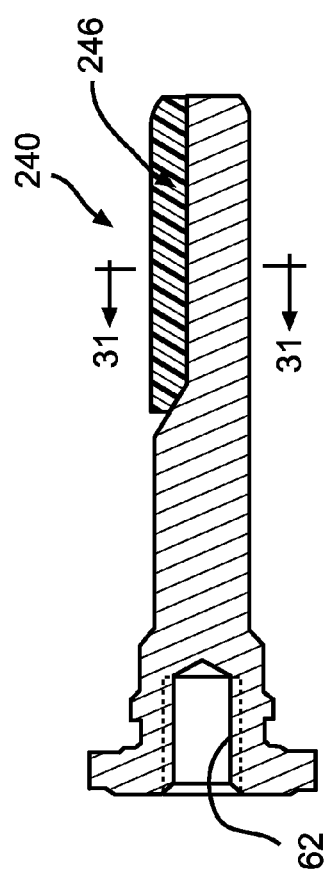

Turning now to FIGS. 17 and 18 and using like reference numbers to indicate corresponding or similar parts, there is illustrated a sixth embodiment of a guide pin, illustrated generally at 150. As shown in this embodiment, a member 152 is provided which is of a sheath-like or hollow cylindrical structure having opposed inner tongue-like members 152A. The members 152A are configured to be disposed and secured in complimentary shaped slots 150A (only one of the two slots 150A being illustrated), formed in opposed sides of the guide pin 150.

In the illustrated embodiment, there is provided more thickness of the member 152 at a first outer surface 152B compared to that provided at an opposite second outer surface 152C. As a result of this, the first outer surface 152B is configured to contact a portion of the bore of the arm of the associated anchor bracket to provide a spring-like biasing effect as described above in connection with the guide pin 12 which offsets the axis of the guide pin relative to the bore and thereby produces a defined point of contact between only a portion of an outer surface of the guide pin and the bore. As can be readily understood, the function and operation of the guide pin 150 is similar to that of the guide pin 12 discussed above. Alternatively, the construction of the guide pin 150 may be other than illustrated and described if so desired.

Turning now to FIG. 19 and using like reference numbers to indicate corresponding or similar parts, there is illustrated a seventh embodiment of a guide pin, illustrated generally at 160. In this embodiment a spring-like member 162 is provided which includes a segmented body having an outer surface which is provided with a plurality of aligned spaced apart raised tabs 162A thereon. As can be readily understood, the tabs 162A of the member 162 are configured to contact a portion of the bore of the arm of the associated anchor bracket to provide a spring-like biasing effect as described above in connection with the guide pin 12 which offsets the axis of the guide pin relative to the bore and thereby produces a defined point of contact between only a portion of an outer surface of the guide pin and the bore. As can be readily understood, the function and operation of the guide pin 160 is similar to that of the guide pin 12 discussed above. Alternatively, the construction of the guide pin 160 may be other than illustrated and described if so desired.

Turning now to FIGS. 20-22 and using like reference numbers to indicate corresponding or similar parts, there is illustrated an eighth embodiment of a guide pin, illustrated generally at 170. In this embodiment a two-piece spring-like member 172 is provided which includes a generally first or clip member 174 and a second spring like member 176 secured thereto. To accomplish this, the member 174 includes cut-outs 174A and the member 176 includes tabs 176 which are disposed in the cut-outs 174A to secure the members 174 and 176 together.

The member 174 further includes a clip portion 174B which is configured to secure the member 172 to the guide pin 170 in a mechanical "snap-fit" therewith via a slot 176 provided therein. As can be readily understood, a pair of raised surface portions 176B of the member 176 are configured to contact a portion of the bore of the arm of the associated anchor bracket to provide a spring-like biasing effect as described above in connection with the guide pin 12 which offsets the axis of the guide pin relative to the bore and thereby produces a defined point of contact between only a portion of an outer surface of the guide pin and the bore. As can be readily understood, the function and operation of the guide pin 170 is similar to that of the guide pin 12 discussed above. Alternatively, the construction of the guide pin 170 may be other than illustrated and described if so desired.

Turning now to FIG. 23 and using like reference numbers to indicate corresponding or similar parts, there is illustrated a ninth embodiment of a guide pin, illustrated generally at 180. In this embodiment a plurality of spring-like "mushroom-shaped" members 182 are secured in openings provided in the guide pin 180. As can be readily understood, the members 182 are configured to contact a portion of the bore of the arm of the associated anchor bracket to provide a spring-like biasing effect as described above in connection with the guide pin 12 which offsets the axis of the guide pin relative to the bore and thereby produces a defined point of contact between only a portion of an outer surface of the guide pin and the bore. Alternatively, the construction of the guide pin 180 may be other than illustrated and described if so desired.

Referring now to FIGS. 24 and 25 and using like reference numbers to indicate corresponding or similar parts, there is illustrated a portion of a second embodiment of a vehicle disc brake assembly, indicated generally at 200, including a tenth embodiment of a guide pin, indicated generally at 202, constructed in accordance with the present invention. In this embodiment, in addition to the bore 54, there is provided a "second smaller" hole or bore 204 in each of a pair of arms 206 and 208 of an anchor bracket 210 of the vehicle disc brake assembly 200. As shown in FIGS. 24 and 25, the hole 204 is formed to intersect and be coaxially offset relative to the bore 54.

In the illustrated embodiment, a spring-like member 208 is disposed in each of the holes 204. The member 208 is provided with a first or "outer rounded" surface 208A which is complimentary to the shape of the hole 204, and a second or "inner rounded" surface 208B which is complimentary to the shape of a shank portion 202A of the guide pin 202. As can be readily understood, the members 208 are configured to contact the hole 204 of the arm of the associated anchor bracket to provide a spring-like biasing effect as described above in connection with the guide pin 12 which offsets the axis of the guide pin relative to the bore and thereby produces a defined point of contact between only a portion of an outer surface of the guide pin and the bore 54. Alternatively, the construction of the guide pin 202, the member 206 and/or the anchor bracket 210 may be other than illustrated and described if so desired.

Referring now to FIGS. 26 and 27 and using like reference numbers to indicate corresponding or similar parts, there is illustrated a portion of a portion of a vehicle disc brake assembly, indicated generally at 220, including an eleventh embodiment of a guide pin, indicated generally at 222, constructed in accordance with the present invention.

In this embodiment, a member 224 is provided comprised of a first or sheath-like member 226 and a second or spring-like member 228. The second member 228 includes an inwardly extending or concave portion 228A which extends inwardly beyond an inner diameter surface 226B of the first member 226. The first member 226 is preferably formed from a rigid material, such as for example steel or "hard" plastic, and the second member 228 is preferably formed from an elastomeric or rubber or other suitable material, if so desired. Preferably, the second 228 is molded in situ with the first member 226 during its manufacturing process.

In the illustrated embodiment, the first member 226 is preferably disposed in the bore 54 by a press or interference fit therewith to provide solid contact between an outer diameter surface 226A of the first member 226, and outer diameter surface 228B of the second member 228, and the bore 54.

In the illustrated embodiment, an inner diameter surface 226B of the first member 226 is at least slightly greater than a outer diameter surface of a shank portion 230 of the guide pin 222. As can be readily understood, the portion 228A of the second member 228 of the member 224 is operative to provide a spring-like biasing effect as described above in connection with the guide pin 12 which offsets the axis of the guide pin relative to the bore and thereby produces a defined point of contact between only a portion of an outer surface of the guide pin and an inner surface 226B of the first member 226 of the member 224. Alternatively, the construction of the guide pin 222 and/or the member 224 may be other than illustrated and described if so desired.

Referring now to FIGS. 28-31 and using like reference numbers to indicate corresponding or similar parts, there is illustrated a twelfth embodiment of a guide pin, illustrated generally at 240. This embodiment is generally similar to the guide pin 120 illustrated in FIGS. 12-14 except that in this embodiment the guide pin 240 includes a pair of flat surfaces 242. In addition, a slot 244 in the guide pin 240 has side walls 244A which are generally perpendicular to a bottom wall 244B thereof. Further, a spring-like member 246 has a slightly more cone-shaped outer profile 246A compared to that of the member 122 shown in FIGS. 12-14. As can be readily understood, the function and operation of the guide pin 240 is similar to that of the guide pin 12 discussed above. Alternatively, the construction of the guide pin 240 may be other than illustrated and described if so desired.

Figure 33:
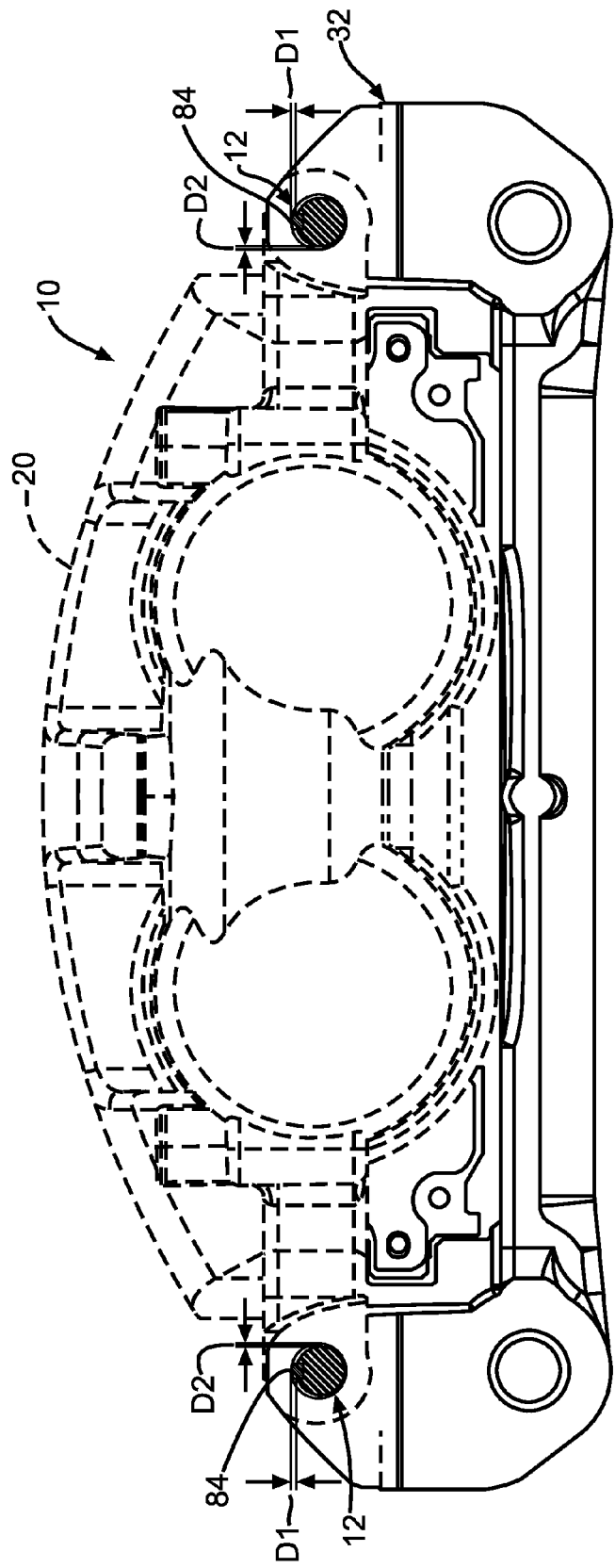
FIG. 33 is a plan view, partly shown in phantom, of a first arrangement of the first embodiment of the vehicle disc brake assembly, including the first embodiment of a guide pin.
Figure 34:
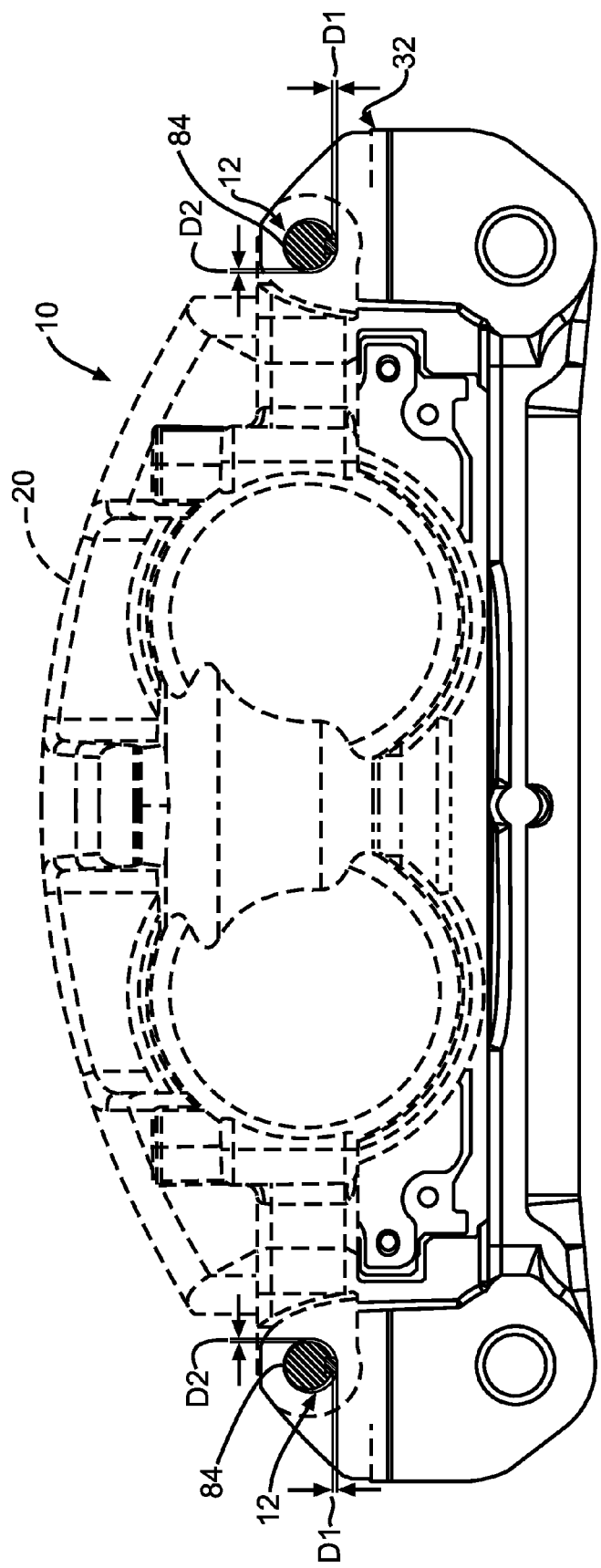
FIG. 34 is a plan view, partly shown in phantom, of a second arrangement of the first embodiment of the vehicle disc brake assembly, including the first embodiment of a guide pin.
Figure 35:
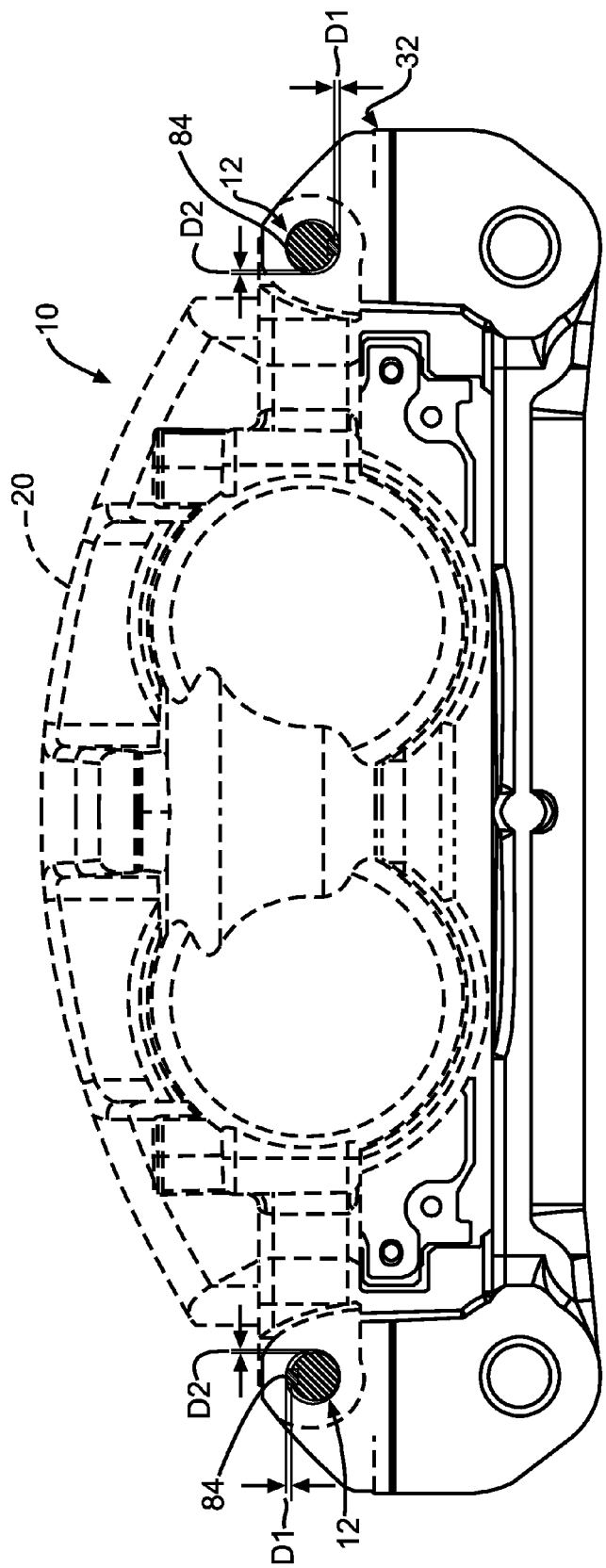
FIG. 35 is a plan view, partly shown in phantom, of a third arrangement of the first embodiment of the vehicle disc brake assembly, including the first embodiment of a guide pin.
Figure 36:
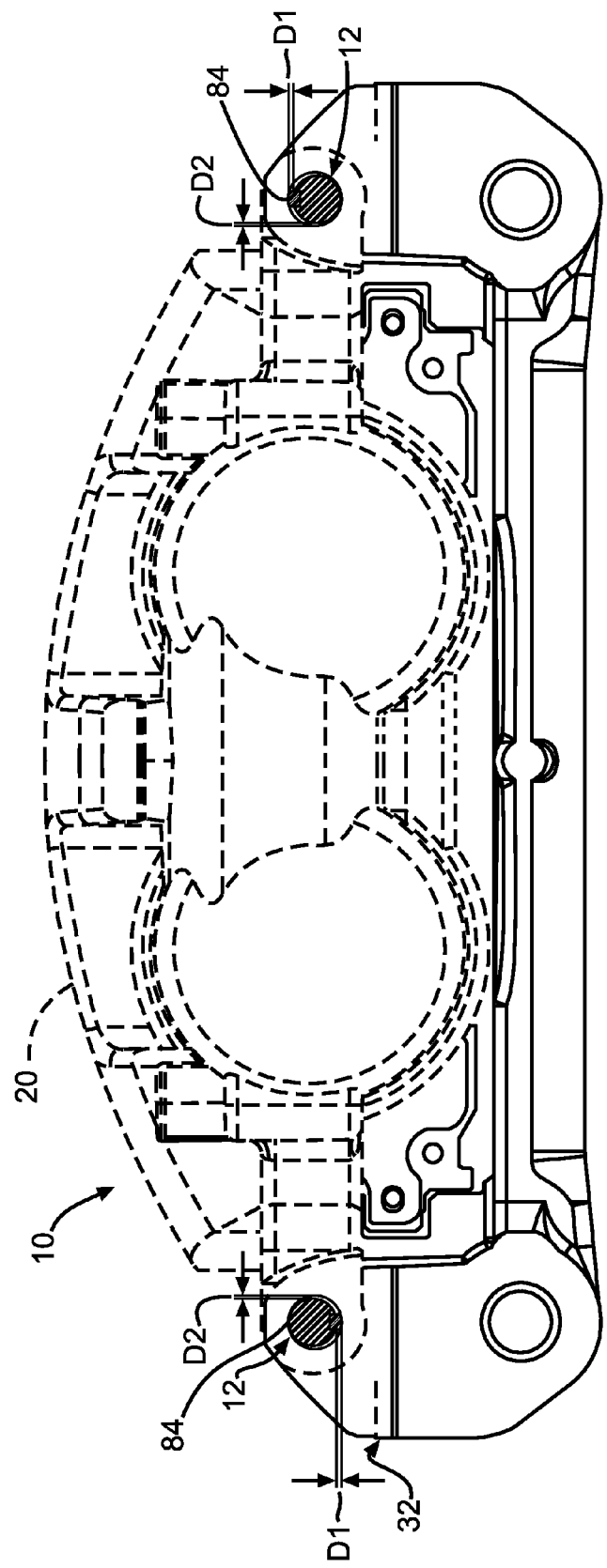
FIG. 36 is a plan view, partly shown in phantom, of a fourth arrangement of the first embodiment of the vehicle disc brake assembly, including the first embodiment of a guide pin.

Referring now to FIGS. 33-36, there are illustrated views showing possible arrangements of the guide pins 12 illustrated in connection with the first embodiment of the vehicle disc brake assembly 10 illustrated in FIGS. 1-6. As shown in FIG. 33, both of the guide pins 12 can be symmetrically arranged with the members 84 both oriented in the same "upward" direction in the bores 54 of the anchor bracket 32. In FIG. 34, both of the guide pins 12 can be symmetrically arranged with the members 84 both oriented in the same "downward" direction in the bores 54 of the anchor bracket 32. In FIG. 35, the guide pins 12 are non-symmetrically arranged with one of the members 84 (i.e., the left hand side guide pin in FIG. 35), oriented in an "upward" direction in the bore 54 of the anchor bracket 32, and the other one of the members 84 (i.e., the right hand side guide pin in FIG. 35), oriented in a "downward" direction in the bore 54 of the anchor bracket 32. In FIG. 36, the guide pins 12 are non-symmetrically arranged with one of the members 84 (i.e., the right hand side guide pin in FIG. 35), oriented in an "upward" direction in the bore 54 of the anchor bracket 32, and the other one of the members 84 (i.e., the left hand side guide pin in FIG. 35), oriented in a "downward" direction in the bore 54 of the anchor bracket 32. Alternatively, the arrangement of the guide pins in the associated bores of the anchor bracket may be other than illustrated and described, if so desired.

In accordance with the provisions of the patent statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A disc brake assembly comprising:
   an anchor bracket having at least one wholly circular bore formed therein, the bore defining a first axis;
   a brake caliper slidably secured to the anchor bracket;
   a pair of brake pads carried by the disc brake assembly; and
   at least one guide pin adapted to be disposed in the bore of the anchor bracket, the at least one guide pin defining a second axis;
   wherein when the at least one guide pin is disposed in the at least one bore of the anchor bracket, the second axis of the at least one guide pin is configured to be offset relative to the first axis of the at least one bore such that there is provided at least one defined point of direct contact between a portion of a shank portion of the at least one guide pin and a portion of an inner surface of the at least one bore;
   wherein at least one member, which is formed separate from the forming of the at least one guide pin, is provided, and wherein the at least one member is operative to bias the at least one guide pin in the at least one bore thereby offsetting the second axis of the at least one guide pin relative to the first axis of the at least one bore.

2. The disc brake assembly of claim 1 wherein the at least one member is formed from an elastomer material.

3. The disc brake assembly of claim 2 wherein the at least one member is a rubber bushing.

4. The disc brake assembly of claim 1 wherein the at least one member is configured to be disposed in a slot provided in the at least one guide pin.

5. The disc brake assembly of claim 4 wherein the at least one member is configured to be secured in the slot by at least one of bonding and gluing.

6. The disc brake assembly of claim 1 wherein the at least one member is a sheath.

7. The disc brake assembly of claim 1 wherein the at least one member is disposed in a slot provided in the at least one guide pin.

8. The disc brake assembly of claim 1 wherein the at least one bore is a two-part bore including a first bore, which is configured to receive the at least one guide pin, and a second bore, which is configured to receive only at least a part of the at least one member.

9. The disc brake assembly of claim 1 wherein the at least one guide pin includes at least one lateral flat surface provided thereon on at least the shank portion thereof.

10. The disc brake assembly of claim 1 wherein the at least one member is secured to one of the at least one guide pin and the at least one bore.

11. A disc brake assembly comprising:
an anchor bracket having a pair of wholly circular bores formed therein, the bores defining a first axis;
a brake caliper slidably secured to the anchor bracket;
a pair of brake pads carried by the disc brake assembly; and
a pair of guide pins a respective one of which is adapted to be disposed in the bores of the anchor bracket, the guide pins defining a second axis;
wherein a pair of members, which are formed separate from the forming of the guide pins, is provided, and wherein when the guide pins are disposed in the bores of the anchor bracket, the second axis of the guide pins is configured to be offset relative to the first axis of the bores by the members such that there is provided at least one defined point of direct contact between a portion of a shank portion of each of the guide pins and a portion of an inner surface of each of the bores.

12. The disc brake assembly of claim 11 wherein the members are configured to be disposed in a slot provided in the guide pins.

13. The disc brake assembly of claim 12 wherein the members are configured to be secured in the slot by at least one of bonding and gluing.

14. The disc brake assembly of claim 11 wherein the members are secured to one of the guide pins and the bores.

15. The disc brake assembly of claim 11 wherein the members are formed from an elastomer material.

16. The disc brake assembly of claim 11 wherein the members are rubber bushings.

17. The disc brake assembly of claim 11 wherein the members are sheaths.

18. The disc brake assembly of claim 11 wherein the members are disposed in a slot provided in the guide pins.

19. The disc brake assembly of claim 11 wherein the bores are two-part bores each including a first bore, which is configured to receive the guide pins, and a second bore, which is configured to receive only at least a part of the members.

20. The disc brake assembly of claim 11 wherein the guide pins include at least one lateral flat surface provided thereon on at least the shank portion thereof.

21. A disc brake assembly comprising:
an anchor bracket having at least one wholly circular bore formed therein, the bore defining a first axis;
a brake caliper slidably secured to the anchor bracket;
a pair of brake pads carried by the disc brake assembly; and
at least one guide pin adapted to be disposed in the bore of the anchor bracket, the at least one guide pin defining a second axis;
wherein a rubber bushing member, which is formed separate from the forming of the at least one guide pin, is provided, and wherein when the at least one guide pin is disposed in the at least one bore of the anchor bracket, the second axis of the at least one guide pin is configured to be offset relative to the first axis of the at least one bore by the rubber bushing member such that there is provided at least one defined point of direct contact between a portion of a shank portion of the at least one guide pin and a portion of an inner surface of the at least one bore.

22. The disc brake assembly of claim 21 wherein the rubber bushing member is disposed in a slot provided in the at least one guide pin.

23. The disc brake assembly of claim 22 wherein the rubber bushing member is configured to be secured in the slot by at least one of bonding and gluing.

24. The disc brake assembly of claim 21 wherein the rubber bushing member is secured to one of the at least one guide pin and the at least one bore.

* * * * *